United States Patent
Takada et al.

(10) Patent No.: US 9,346,920 B2
(45) Date of Patent: May 24, 2016

(54) WATER-REPELLENT AND OIL-REPELLENT COMPOSITION, AND WATER-REPELLENT FILM FORMED BY USING THE COMPOSITION

(71) Applicant: CANON FINETECH INC., Misato-shi, Saitama-ken (JP)

(72) Inventors: Yasuhiro Takada, Fukui (JP); Takayuki Okawa, Fukui (JP); Manami Hoshino, Fukui (JP); Kenichi Kawano, Fukui (JP)

(73) Assignee: CANON FINETECH INC., Misato-Shi (JP)

(*) Notice: Subject to any disclaimer, the term of this patent is extended or adjusted under 35 U.S.C. 154(b) by 0 days.

(21) Appl. No.: 14/566,015

(22) Filed: Dec. 10, 2014

(65) Prior Publication Data

US 2015/0299469 A1    Oct. 22, 2015

(30) Foreign Application Priority Data

Apr. 18, 2014   (JP) .................................. 2014-086264

(51) Int. Cl.
| | | |
|---|---|---|
| C08G 77/24 | (2006.01) | |
| C09D 183/08 | (2006.01) | |
| C09D 5/00 | (2006.01) | |
| C09D 5/16 | (2006.01) | |

(52) U.S. Cl.
CPC *C08G 77/24* (2013.01); *C09D 5/00* (2013.01); *C09D 5/1681* (2013.01); *C09D 183/08* (2013.01)

(58) Field of Classification Search
None
See application file for complete search history.

(56) References Cited

U.S. PATENT DOCUMENTS 5,371,155 A * 12/1994 Kobayashi .................... 525/477
5,442,011 A * 8/1995 Halling ................. C04B 41/009
                                                        106/287.11
2002/0037417 A1 * 3/2002 Sato ...................... C08G 77/24
                                                        428/447
2006/0159849 A1    7/2006 Morita et al.

FOREIGN PATENT DOCUMENTS

| JP | 58-172245 | * | 10/1983 |
|---|---|---|---|
| JP | 9-13017 | A | 1/1997 |
| JP | 2002-053806 | * | 2/2002 |
| JP | 2006-291266 | A | 10/2006 |
| JP | 2007-31327 | A | 2/2007 |
| JP | 2008-15084 | A | 1/2008 |
| JP | 2008-038086 | * | 2/2008 |
| JP | 4325555 | B2 | 9/2009 |
| JP | 2012-219217 | A | 11/2012 |

OTHER PUBLICATIONS

Machine-generated translation of JP 2002-053806 into English.*

* cited by examiner

Primary Examiner — Marc Zimmer
(74) Attorney, Agent, or Firm — Fitzpatrick, Cella, Harper & Scinto

(57) ABSTRACT

A water-repellent and oil-repellent composition, including an incompletely condensed product $P_2$ obtained by further condensing an incompletely condensed product $P_1$ containing a fluorine-containing alkoxy silane unit a derived from a fluorine-containing alkoxy silane compound α represented by the following general formula (1) with an alkoxy silane compound β represented by the following general formula (2), wherein a content $a_1$ (mol %) of the fluorine-containing alkoxy silane unit a in the incompletely condensed product $P_1$ and a content $a_2$ (mol %) of the fluorine-containing alkoxy silane unit a in the incompletely condensed product $P_2$ satisfy a relationship represented by the following expression (1):

$Rf-Y_q-A_p-Z-SiX_3$     General formula (1)

$R-SiX_3$     General formula (2)

$a_1/a_2 \geq 2$     Expression (1).

12 Claims, No Drawings

WATER-REPELLENT AND OIL-REPELLENT COMPOSITION, AND WATER-REPELLENT FILM FORMED BY USING THE COMPOSITION

BACKGROUND OF THE INVENTION

1. Field of the Invention

The present invention relates to a water-repellent and oil-repellent composition useful as a coating agent for modifying a surface of a substance, and a water-repellent film formed by using the water-repellent and oil-repellent composition.

2. Description of the Related Art

A fluorine-containing alkoxy silane compound having a perfluoroalkyl group (which may hereinafter be referred to as "Rf group") has been widely used as a coating agent for surface modification because the compound has water repellency and oil repellency derived from a fluorine atom.

A fluorine-containing alkoxy silane compound having an Rf group having 8 or more carbon atoms synthesized by telomerization has heretofore been mainly used as a fluorine-containing alkoxy silane compound to be used in a surface modification application. However, it has been reported that the fluorine-containing alkoxy silane compound having an Rf group having 8 or more carbon atoms is decomposed or metabolized in a living organism to produce perfluorooctanoic acid (hereinafter sometimes referred to as "PFOA") showing bioaccumulative property (Japanese Patent Application Laid-Open No. 2012-219217). Accordingly, in the United States, a project for reducing the amounts of PFOA, analogues thereof, and precursors thereof to be discharged to the environment as well as their contents in products has been progressed. Therefore, in the present circumstances, it is inevitable to refrain from producing or using the fluorine-containing alkoxy silane compound having an Rf group having 8 or more carbon atoms.

A fluorine-containing alkoxy silane compound having an Rf group having 6 or less carbon atoms or fluorine-containing alkoxy silane compound having a perfluorooxyalkylene group that has low risk to a living organism and an environment has been proposed as an alternative to the fluorine-containing alkoxy silane compound having an Rf group having 8 or more carbon atoms.

Specifically, it has been proposed that a fluorine-containing compound which has an Rf group having 5 or less carbon atoms and in which the Rf group is bonded to an alkoxysilyl group through a linking group be used as a material for forming an alternate line-shaped pattern (Japanese Patent No. 4325555).

Further, it has been proposed that a composition containing, as an essential component, a fluorine compound which has a fluorine-containing group having an Rf group having 1 to 6 carbon atoms and in which the fluorine-containing group is bonded to an alkoxysilyl group through a linking group be used as a liquid-repellent surface treatment agent for photolithography (Japanese Patent Application Laid-Open No. 2008-15084).

Further, it has been proposed that a composition containing a fluorine compound which has an Rf group having 1 to 5 carbon atoms and in which the Rf group is bonded to an alkoxysilyl group through a linking group be used as a surface treatment agent for a substrate (Japanese Patent Application Laid-Open No. 2006-291266).

However, when such a fluorine-containing alkoxy silane compound having an Rf group having 6 or less carbon atoms as described in the foregoing is used as a coating agent for forming a water-repellent film, water repellency of the formed water-repellent film has not been at a sufficiently satisfactory level.

SUMMARY OF THE INVENTION

The present invention has been made in view of such related-art problems as described in the foregoing. That is, an object of the present invention is to provide a coating agent for forming a water-repellent film that does not produce PFOA, has low risk to a living organism and an environment, and shows water repellency equal to or higher than that in the case where a fluorine-containing alkoxy silane compound having an Rf group having 8 or more carbon atoms is used.

The inventors of the present invention have made extensive studies to solve the problems, and as a result, have found that the problems can be solved not by using a fluorine-containing alkoxy silane compound α having an Rf group having 6 or less carbon atoms as it is as a coating agent but by forming a water-repellent film through the use of a coating agent of a composition containing an incompletely condensed product $P_2$ obtained by incompletely condensing the fluorine-containing alkoxy silane compound α in advance to provide an incompletely condensed product $P_1$ and then condensing the incompletely condensed product $P_1$ with an alkoxy silane compound β containing no Rf group at a specific ratio to provide the incompletely condensed product $P_2$. Thus, the inventors have completed the present invention. That is, according to the present invention, the following water-repellent and oil-repellent composition, and water-repellent film are provided.

(1) Water-Repellent and Oil-Repellent Composition:

A water-repellent and oil-repellent composition, including an incompletely condensed product $P_2$ obtained by further condensing an incompletely condensed product $P_1$ containing a fluorine-containing alkoxy silane unit a derived from a fluorine-containing alkoxy silane compound α represented by the following general formula (1) with an alkoxy silane compound β represented by the following general formula (2), in which a content $a_1$ (mol %) of the fluorine-containing alkoxy silane unit a in the incompletely condensed product $P_1$ and a content $a_2$ (mol %) of the fluorine-containing alkoxy silane unit a in the incompletely condensed product $P_2$ satisfy a relationship represented by the following expression (1),

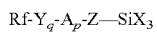   General formula (1)

(In the general formula (1):

Rf represents a perfluoroalkyl group having 1 or more and 6 or less carbon atoms;

Y represents an alkanediyl group represented by $-(CH_2)_m-$, m represents an integer of 1 or more and 4 or less, and q represents 0 or 1;

A represents a linking group represented by $-CO-O-$, $-O-CO-$, $-O-$, $-S-$, $-CO-S-$, $-CONH-$, $-NHCO-$, $-NHCO-O-$, $-O-CONH-$, or $-NH-CONH-$, and p represents 0 or 1, provided that when p represents 0, q represents 0;

Z represents an alkanediyl group represented by $-(CH_2)_n-$, and n represents an integer of 1 or more and 20 or less; and X represents an alkoxy group represented by $-OC_rH_{2r+1}$, r represents an integer of 1 or more and 4 or less, and the three X's may be groups identical to one another or may be groups different from one another)

 General formula (2)

(In the general formula (2):

R represents an alkyl group having 1 or more and 6 or less carbon atoms; and

X has the same meaning as that of the general formula (1))

$$a_1/a_2 \geq 2 \quad \text{Expression (1)}.$$

In the water-repellent and oil-repellent composition of the present invention, it is preferred that the content $a_1$ (mol %) of the fluorine-containing alkoxy silane unit a in the incompletely condensed product $P_1$ and the content $a_2$ (mol %) of the fluorine-containing alkoxy silane unit a in the incompletely condensed product $P_2$ satisfy relationships represented by the following expression (2) and the following expression (3), $$20 \leq a_1 \leq 100 \quad \text{Expression (2)}$$

$$0.5 \leq a_2 \leq 20 \quad \text{Expression (3)}.$$

Further, in the water-repellent and oil-repellent composition of the present invention, it is preferred that the incompletely condensed product $P_1$ includes an incompletely condensed product containing the fluorine-containing alkoxy silane unit a and an alkoxy silane unit b derived from the alkoxy silane compound β.

(2) Water-Repellent Film:

A water-repellent film, which is formed by using the above-described water-repellent and oil-repellent composition.

The water-repellent film of the present invention preferably has a contact angle of 90° or more.

The water-repellent and oil-repellent composition of the present invention can form a water-repellent film that does not produce PFOA, has low risk to a living organism and an environment, and shows water repellency equal to or higher than that in the case where a fluorine-containing alkoxy silane compound having an Rf group having 8 or more carbon atoms is used. In addition, the water-repellent film of the present invention shows water repellency equal to or higher than that in the case where a fluorine-containing alkoxy silane compound having an Rf group having 8 or more carbon atoms is used.

DESCRIPTION OF THE EMBODIMENTS

Embodiments of the present invention are hereinafter described in detail.

(1) Water-Repellent and Oil-Repellent Composition:

A water-repellent and oil-repellent composition of the present invention is a composition containing an incompletely condensed product $P_2$ obtained by further condensing an incompletely condensed product $P_1$ containing a fluorine-containing alkoxy silane unit a derived from a fluorine-containing alkoxy silane compound α with an alkoxy silane compound β containing no fluorine.

The water-repellent and oil-repellent composition of the present invention can be produced by using the fluorine-containing alkoxy silane compound α having a perfluoroalkyl group (Rf group) having 6 or less carbon atoms. The fluorine-containing alkoxy silane compound α does not produce PFOA, has low risk to a living organism and an environment, and can be applied to a project for reducing PFOA or the like under progress in the U.S.

In addition, the water-repellent and oil-repellent composition of the present invention can be used as a coating agent upon formation of a water-repellent film. Despite the fact that the water-repellent and oil-repellent composition of the present invention uses the incompletely condensed product $P_2$ having an Rf group having 6 or less carbon atoms as a constituent component, the composition can form a water-repellent film showing water repellency equal to or higher than that in the case where a fluorine-containing alkoxy silane compound having an Rf group having or more carbon atoms is used. The inventors of the present invention have assumed that when the fluorine-containing alkoxy silane compound α having an Rf group having 6 or less carbon atoms is incompletely condensed in advance to provide the incompletely condensed product $P_1$, a portion in which the fluorine-containing alkoxy silane unit a is localized is formed and many of the Rf groups are oriented toward the surface of the water-repellent film, and hence the water-repellent film shows high water repellency.

(1-1) Fluorine-Containing Alkoxy Silane Compound α:

The fluorine-containing alkoxy silane compound α is a compound represented by the following general formula (1) and is a compound serving as a synthetic raw material for the incompletely condensed product $P_1$.

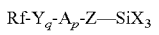 General formula (1)

Rf in the general formula (1) represents a perfluoroalkyl group (Rf group) having 1 or more and 6 or less carbon atoms. Although the constitution of the Rf group except the foregoing is not particularly limited, a linear Rf group is preferred.

—$SiX_3$ in the general formula (1) represents a trialkoxysilyl group. X represents an alkoxy group represented by —$OC_rH_{2r+1}$, and the number r of carbon atoms of the alkoxy group X is an integer of 1 or more and 4 or less. The three alkoxy groups X's may be groups identical to one another or may be groups different from one another, and the three alkoxy groups X's are preferably groups identical to one another. Although the constitution of the trialkoxysilyl group except the foregoing is not particularly limited, it is preferred that the three alkoxy groups be all linear and have the same number of carbon atoms.

Z in the general formula (1) represents a linking group. That is, the perfluoroalkyl group (Rf) and the trialkoxysilyl group —$SiX_3$ are bonded to each other through the linking group Z. The linking group Z is an alkanediyl group represented by —$(CH_2)_n$—. The number of repetition n of the methylene unit is an integer of 1 or more and 20 or less. When n is set to 20 or less, the trialkoxysilyl group (—$SiX_3$) is easily hydrolyzed into a silanol group (—$Si(OH)_3$) and hence the reactivity of the condensation reaction improves.

Y in the general formula (1) represents a linking group and represents an alkanediyl group represented by —$(CH_2)_m$—. The number of repetition m of a methylene unit is an integer of 1 or more and 4 or less. When m is set to or less, the Rf group is easily oriented toward the surface of the water-repellent film upon formation of the water-repellent film, and hence the water repellency of the water-repellent film can be improved. The number of repetition q of the linking group Y is 0 or 1, and q preferably represents 0. A linking group A to be described later needs to be introduced to introduce the linking group Y. However, it is preferred to avoid the introduction of the linking group Y (i.e., q=0) because the presence of the linking group Y facilitates the hydrolysis of the linking group A.

A in the general formula (1) represents a linking group and represents any one of the following functional groups: —CO—O—, —O—CO—, —O—, —S—, —CO—S—, —CONH—, —NHCO—, —NHCO—O—, —O—CONH—, and —NHCONH—. The number of repetition p of the linking group A is 0 or 1, provided that when the number of repetition p of the linking group A is 0, the number of repetition q of the linking group Y is 0. That is, when the number of repetition p of the linking group A is 0, the fluorine-containing alkoxy silane compound α has a structure in which the Rf group and the —SiX₃ group are bonded to each other only through the linking group Z.

The necessity and molecular structure of the linking group A can be arbitrarily set from the viewpoint of improving the ease of synthesis and the durability of the water-repellent film to be formed. Of the functional groups, —CO—O—, —O—CO—, —O—, —S—, and —CO—S— are preferred. These functional groups can improve the durability of the water-repellent film because they are hardly hydrolyzed.

(1-1-1) Synthesis Scheme and Reaction Solvent:

The fluorine-containing alkoxy silane compound α represented by the general formula (1) can be synthesized by a known method. The synthesis of the fluorine-containing alkoxy silane compound α can be performed in a solvent or in the absence of a solvent. A solvent that hardly affects a reaction and has good solubility for a raw material only needs to be selected as a reaction solvent upon its synthesis in a solvent, and the use amount of the reaction solvent is not particularly limited. In addition, a conventionally known catalyst can be used upon synthesis of the fluorine-containing alkoxy silane compound α.

(1-1-1A) Compound in which Linking Group A is —CO—O— or —O—CO—:

The fluorine-containing alkoxy silane compound α in which the linking group A is —CO—O— can be synthesized according to the following scheme 1.

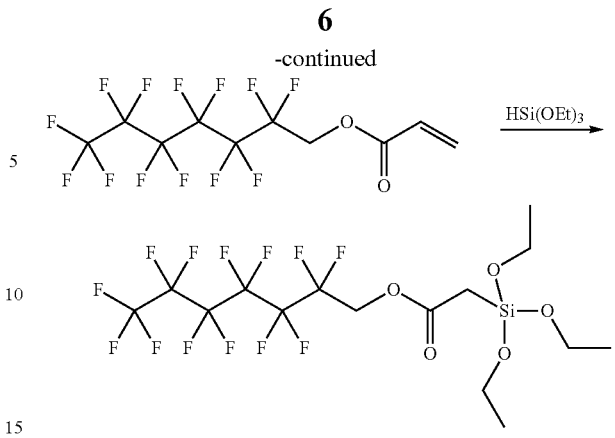

In a first step (esterification reaction) shown in the scheme 1 or 2, for example, an ether-based solvent such as diethyl ether or tetrahydrofuran, a ketone-based solvent such as acetone or methyl isobutyl ketone, an ester-based solvent such as ethyl acetate or butyl acetate, a hydrocarbon-based solvent such as hexane, heptane, toluene, or xylene, or a halogenated hydrocarbon-based solvent such as dichloromethane or chloroform can be used as a reaction solvent. An alcohol as a raw material added in an excess amount to a reaction system can also be used as a reaction solvent.

(Scheme 1)

In addition, the fluorine-containing alkoxy silane compound α in which the linking group A is —O—CO— can be synthesized according to the following scheme 2.

(Scheme 2)

In addition, in a second step (hydrosilylation reaction) shown in the scheme 1 or 2, for example, an alcohol such as methanol or ethanol as well as the ether-based solvent, the ketone-based solvent, the ester-based solvent, the hydrocarbon-based solvent, or the halogenated hydrocarbon-based solvent can be used as a reaction solvent. Further, Speier's catalyst, Karstedt's catalyst, and the like can be used in the hydrosilylation reaction.

(1-1-1B) Compound in which Linking Group A is —O— or —S—:

The fluorine-containing alkoxy silane compound in which the linking group A is —O— can be synthesized according to the following scheme 3.

(Scheme 3)

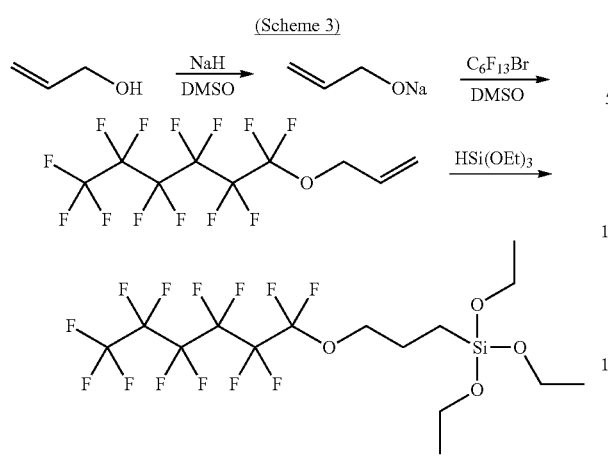

In addition, the fluorine-containing alkoxy silane compound in which the linking group A is —S— can be synthesized according to the following scheme 4.

(Scheme 4)

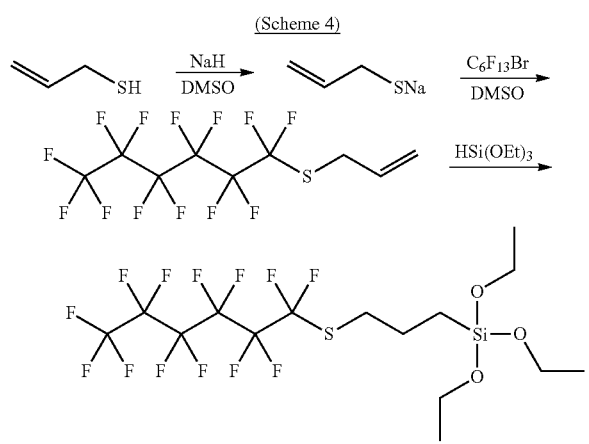

In a first step (etherification reaction or sulfidation reaction) shown in the scheme 3 or 4, dimethyl sulfoxide, acetonitrile, N,N-dimethylformamide, or the like can be used as a reaction solvent. In addition, in a second step (hydrosilylation reaction) shown in the scheme 3 or 4, the same solvent and same catalyst as those in the hydrosilylation reaction of the scheme 1 or 2 can be used.

(1-1-1C) Compound in which Linking Group A is —CO—S—:

The fluorine-containing alkoxy silane compound in which the linking group A is —CO—S— can be synthesized according to the following scheme 5.

(Scheme 5)

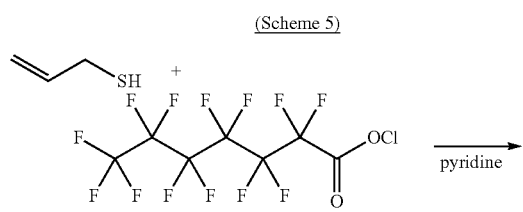

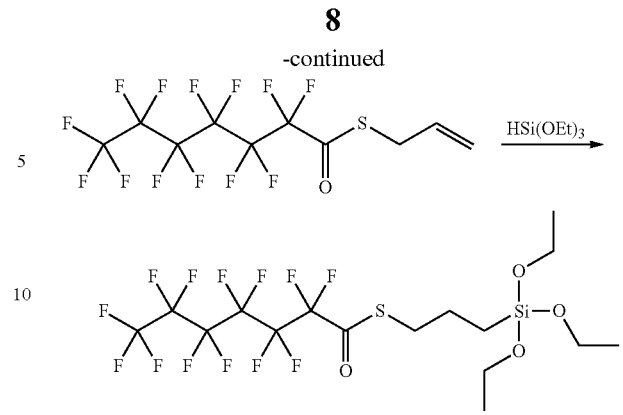

In a first step (thioesterification reaction) shown in the scheme 5, for example, an amine-based solvent such as triethylamine or pyridine as well as the same solvent as that in the esterification reaction of the scheme 1 or 2 can be used. A thiol as a raw material added in an excess amount to a reaction system can also be used as a reaction solvent. In addition, in a second step (hydrosilylation reaction) shown in the scheme 3 or 4, the same solvent and same catalyst as those in the hydrosilylation reaction of the scheme 1 or 2 can be used.

(1-1-1E) Compound in which Linking Group A is —CONH— or —NHCO—:

The fluorine-containing alkoxy silane compound α in which the linking group A is —CONH— can be synthesized according to the following scheme 6.

(Scheme 6)

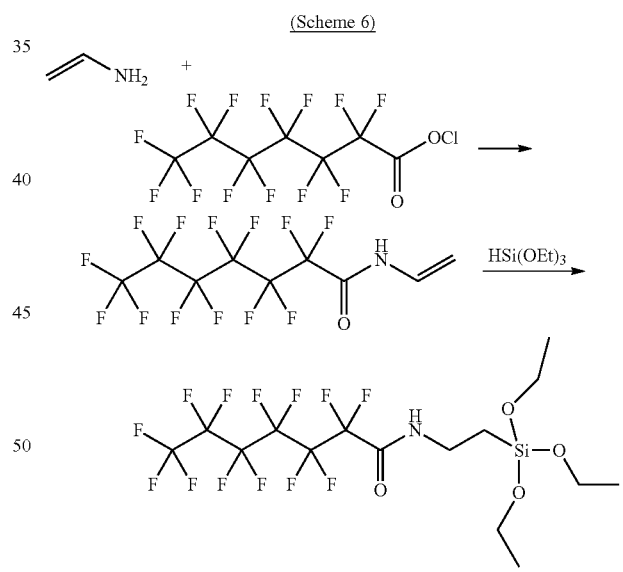

In addition, the fluorine-containing alkoxy silane compound α in which the linking group A is —NHCO— can be synthesized according to the following scheme 7.

(Scheme 7)

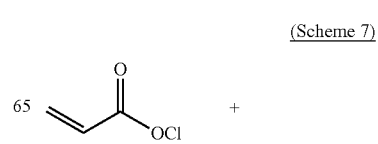

-continued

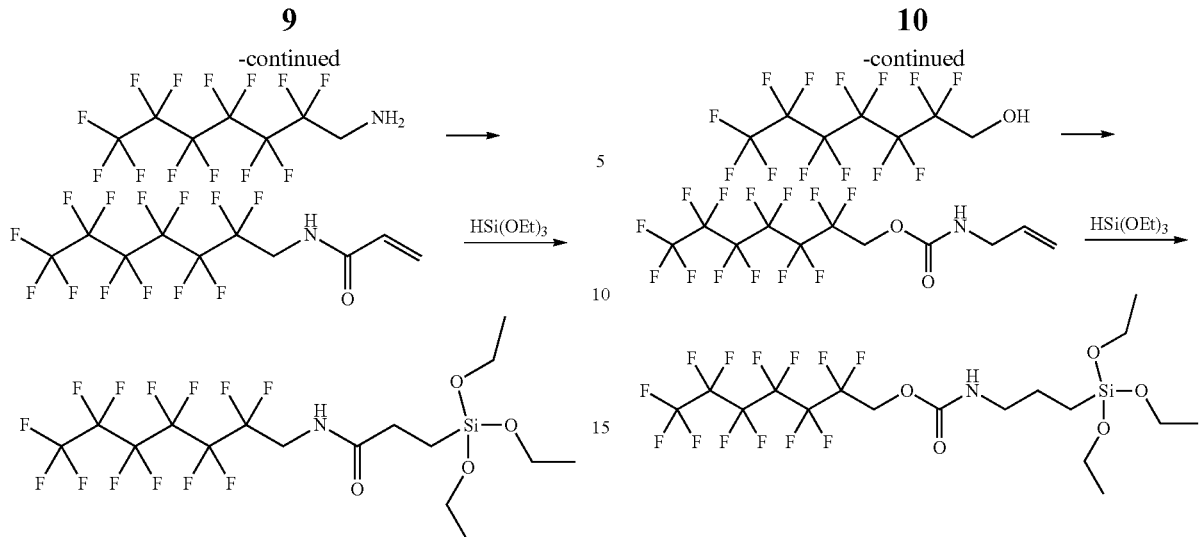

In a first step (amidation reaction) shown in the scheme 6 or 7, for example, the same solvent as that in the esterification reaction of the scheme 1 or 2 can be used. An amine as a raw material added in an excess amount to a reaction system can also be used as a reaction solvent. In addition, in a second step (hydrosilylation reaction) shown in the scheme 6 or 7, the same solvent and same catalyst as those in the hydrosilylation reaction of the scheme 1 or 2 can be used.

(1-1-1F) Compound in which Linking Group A is —NHCO—O— or —O—CONH—:

The fluorine-containing alkoxy silane compound α in which the linking group A is —NHCO—O— can be synthesized according to the following scheme 8.

(Scheme 8)

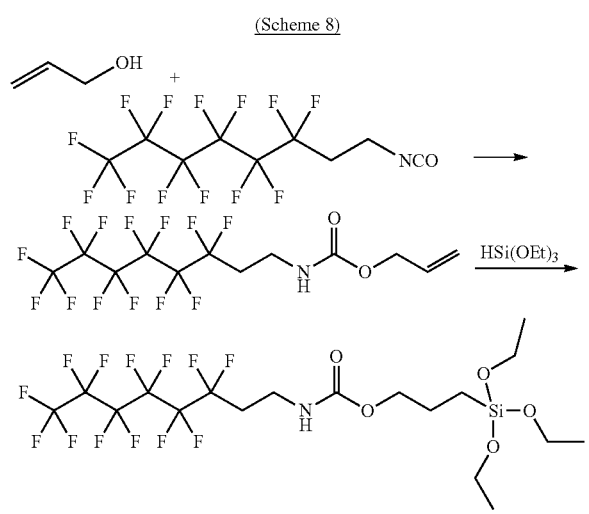

In addition, the fluorine-containing alkoxy silane compound α in which the linking group A is —O—CONH— can be synthesized according to the following scheme 9.

(Scheme 9)

In a first step (urethane forming reaction) shown in the scheme 8 or 9, for example, the same solvent as that in the esterification reaction of the scheme 1 or 2 can be used. An alcohol as a raw material added in an excess amount to a reaction system can also be used as a reaction solvent. In addition, in a second step (hydrosilylation reaction) shown in the scheme 8 or 9, the same solvent and same catalyst as those in the hydrosilylation reaction of the scheme 1 or 2 can be used.

(1-1-1G) Compound in which Linking Group A is —NH-CONH—:

The fluorine-containing alkoxy silane compound in which the linking group A is —NHCONH— can be synthesized according to the following scheme 10.

(Scheme 10)

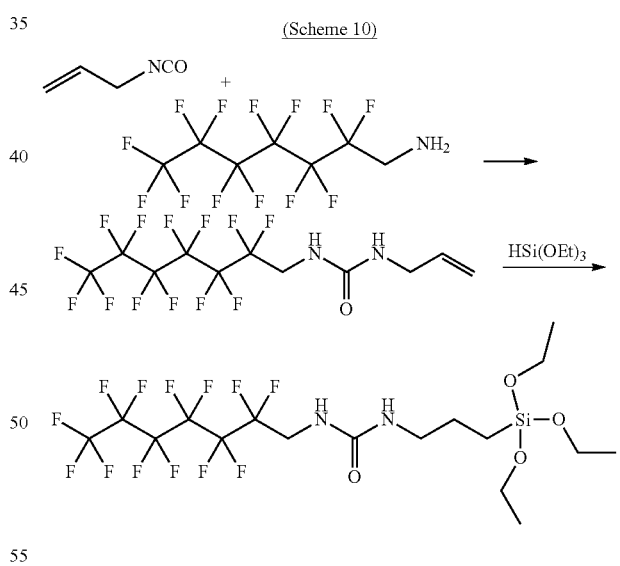

In a first step (urea forming reaction) shown in the scheme 10, for example, the same solvent as that in the esterification reaction of the scheme 1 or 2 can be used. An amine as a raw material added in an excess amount to a reaction system can also be used as a reaction solvent. In addition, in a second step (hydrosilylation reaction) shown in the scheme 10, the same solvent and same catalyst as those in the hydrosilylation reaction of the scheme 1 or 2 can be used.

(1-1-1H) Compound Having No Linking Group A:

The fluorine-containing alkoxy silane compound having no linking group A can be synthesized according to the following scheme 11.

(Scheme 11)

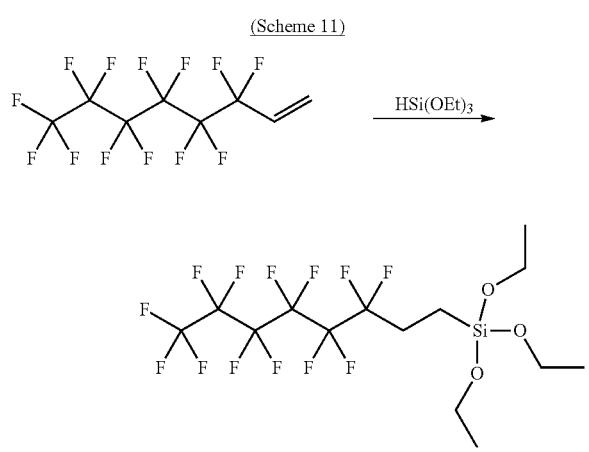

In a reaction shown in the scheme 11, the same solvent and same catalyst as those in the hydrosilylation reaction of the scheme 1 or 2 can be used.

(1-1-2) Other Reaction Condition:

Reaction conditions upon synthesis of the fluorine-containing alkoxy silane compound α such as reaction temperature and reaction atmosphere are not particularly limited. The reaction temperature only needs to be appropriately set depending on, for example, the extent to which the reaction progresses, a reagent to be used, or the boiling point of a reaction solvent. In addition, examples of the reaction atmosphere may include an inert gas atmosphere such as nitrogen or argon, and an atmosphere such as air.

(1-1-3) Identification of Compound:

The molecular structure of the synthesized fluorine-containing alkoxy silane compound α can be identified with, for example, a nuclear magnetic resonance apparatus (NMR) or an infrared spectrophotometer (IR).

(1-1-4) Specific Molecular Structure:

Examples of the molecular structure of the fluorine-containing alkoxy silane compound α are given below. It should be noted that the fluorine-containing alkoxy silane compound α to be used in the present invention is not limited thereto.

TABLE 1

Structure (1) of fluorine-containing alkoxy silane compound α

| Compound | Structural formula |
|---|---|
| α-1 | |
| α-2 | |
| α-3 | |
| α-4 | |

TABLE 1-continued
Structure (1) of fluorine-containing alkoxy silane compound α
| Compound | Structural formula |
|---|---|
| α-5 | 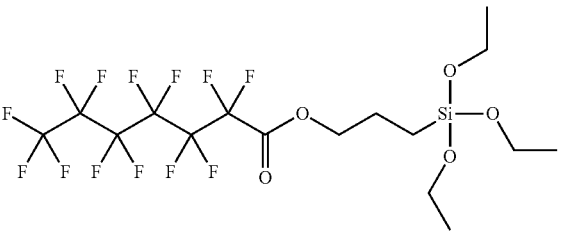 [SMILES: CCO[Si](CCCOC(=O)C(F)(F)C(F)(F)C(F)(F)C(F)(F)C(F)(F)C(F)(F)F)(OCC)OCC] |
| α-6 | |
| α-7 | |
| α-8 | |
TABLE 2
Structure (2) of fluorine-containing alkoxy silane compound α
| Compound | Structural formula |
|---|---|
| α-9 | 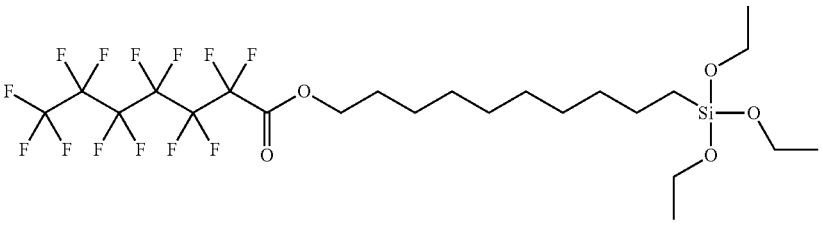 [SMILES: CCO[Si](CCCCCCCCCCOC(=O)C(F)(F)C(F)(F)C(F)(F)C(F)(F)C(F)(F)C(F)(F)F)(OCC)OCC] |
| α-10 | |

TABLE 2-continued
Structure (2) of fluorine-containing alkoxy silane compound α
| Compound | Structural formula |
|---|---|
| α-11 | 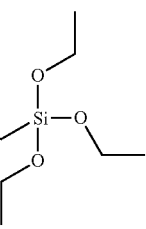 |
| α-12 | 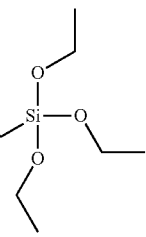 |
| α-13 | 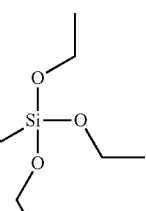 |
| α-14 | 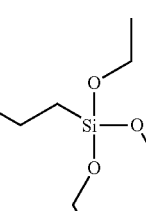 |
| α-15 | 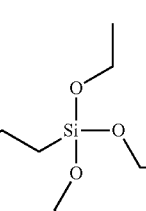 |
| α-16 | 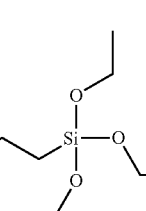 |

TABLE 2-continued

Structure (2) of fluorine-containing alkoxy silane compound α

| Compound | Structural formula |
|---|---|
| α-17 |  |

(1-2) Alkoxy Silane Compound β:

The alkoxy silane compound β is a compound represented by the following general formula (2) and is a compound serving as a synthetic raw material for the incompletely condensed product $P_2$. In addition, the alkoxy silane compound β can be used as the synthetic raw material for the incompletely condensed product $P_1$ together with the fluorine-containing alkoxy silane compound α.

$$R\text{—}SiX_3 \qquad \text{General Formula (2)}$$

R in the general formula (2) represents an alkyl group having 1 or more and 6 or less carbon atoms. Setting the number of carbon atoms of the alkyl group R to 6 or less improves the solubility of a condensed product to be produced in a solvent and hence facilitates its subsequent handling. Although the constitution of the alkyl group R except the foregoing is not particularly limited, a linear alkyl group is preferred. It should be noted that X in the general formula (2) has the same meaning as that of the general formula (1).

The alkoxy silane compound β is a compound having no Rf group and does not have a reactive functional group except an alkoxy group (such as a vinyl group, a (meth)acryloyl group, an amino group, an epoxy group, or a sulfide group), and a conventionally known alkoxy silane compound on the market can be used. Typical examples of the molecular structure of the alkoxy silane compound β are given below. It should be noted that the alkoxy silane compound β to be used in the present invention is not limited thereto.

TABLE 3

Structure of alkoxy silane compound β

| Compound | Structural formula | Trade name |
|---|---|---|
| β-1 |  | [KBE-13] (manufactured by Shin-Etsu Chemical Co., Ltd.) |
| β-2 |  | [KBM-13] (manufactured by Shin-Etsu Chemical Co., Ltd.) |
| β-3 |  | [KBM-3063] (manufactured by Shin-Etsu Chemical Co., Ltd.) |

(1-3) Silane Compound γ:

The silane compound γ is a silane compound other than the fluorine-containing alkoxy silane compound α and the alkoxy silane compound β. An example thereof may be a silane compound having a reactive functional group other than an alkoxy group (such as a vinyl group, a (meth)acryloyl group, an amino group, an epoxy group, or a sulfide group). The silane compound γ can be used as a synthetic raw material for the incompletely condensed product $P_1$ or the incompletely condensed product $P_2$ together with the fluorine-containing alkoxy silane compound α and the alkoxy silane compound β.

(1-4) Incompletely Condensed Product $P_1$:

The incompletely condensed product $P_1$ is an incompletely condensed product containing the fluorine-containing alkoxy silane unit a derived from the fluorine-containing alkoxy silane compound α, and serves as an intermediate for synthesizing the incompletely condensed product $P_2$ which is a main component of the water-repellent and oil-repellent composition of the present invention. The incompletely condensed product $P_1$ may contain an alkoxy silane unit b derived from the alkoxy silane compound β and a silane unit g derived from the silane compound γ in addition to the fluorine-containing alkoxy silane unit a. The incompletely condensed product $P_1$ is preferably an incompletely condensed product containing the fluorine-containing alkoxy silane unit a and the alkoxy silane unit b.

(1-4-1) Definition of Incomplete Condensation:

The term "incomplete condensation" as used herein means that the fluorine-containing alkoxy silane compound α or the alkoxy silane compound β (which may hereinafter be referred to as "fluorine-containing alkoxy silane compound α or the like") is condensed in a state in which an unreacted alkoxy group or hydroxyl group remains.

In general, when an alkoxy silane is hydrolyzed to produce a silanol group, a dehydration condensation reaction occurs between its molecules to form a siloxane bond. The fluorine-containing alkoxy silane compound α or the like has three alkoxy groups, and all of them can form a siloxane bond. However, the incompletely condensed product $P_1$ is a condensed product in which the fluorine-containing alkoxy silane compound α or the like is condensed in a state in which an unreacted alkoxy group or hydroxyl group (which may hereinafter be referred to as "alkoxy group or the like") partially remains.

More specifically, when a state in which three unreacted alkoxy groups or the like remain in the fluorine-containing alkoxy silane unit a or the alkoxy silane unit b (which may hereinafter be referred to as "fluorine-containing alkoxy silane unit a or the like") is represented by T0, a state in which two unreacted alkoxy groups or the like remain therein is represented by T1, a state in which one unreacted alkoxy group or the like remains therein is represented by T2, and a state in which all alkoxy groups or the like are utilized in a dehydration condensation reaction and hence no unreacted alkoxy group remains therein is represented by T3, the incompletely condensed product $P_1$ is a condensed product containing a unit in the state T1 or T2 as the fluorine-containing alkoxy silane unit a or the like. In other words, all the fluorine-containing alkoxy silane units a or the like of the incompletely condensed product $P_1$ are in the state T1, T2 or T3 (mainly in the state T1 or T2) and consequently are not in the state T0. It should be noted that the state (T0 to T3) of the fluorine-containing alkoxy silane unit a or the like in the incompletely condensed product $P_1$ can be confirmed by means of Si-NMR.

(1-4-2) Synthesis Method:

The incompletely condensed product $P_1$ can be synthesized by hydrolyzing the fluorine-containing alkoxy silane compound α and subjecting the resultant to polycondensation. At the time of the synthesis, the reaction may be performed by adding the alkoxy silane compound β or the silane compound γ in addition to the fluorine-containing alkoxy silane compound α.

(1-4-2A) Reaction Solvent:

The incompletely condensed product $P_1$ can be synthesized in a solvent or in the absence of a solvent. Examples of the reaction solvent to be used upon its synthesis in a solvent include alcohol-based solvents such as methanol, ethanol, and propanol. It should be noted that the use amount of the reaction solvent is not particularly limited.

(1-4-2B) Water for Hydrolysis:

Upon synthesis of the incompletely condensed product $P_1$, water is preferably added for hydrolyzing the fluorine-containing alkoxy silane compound α, the alkoxy silane compound β, and the silane compound γ serving as raw materials for the incompletely condensed product $P_1$. Although the addition amount of water is not particularly limited, water is preferably added in an amount in the range of from 0.5 equivalent or more to 2 equivalents or less with respect to all alkoxy groups in the raw materials.

(1-4-2C) Catalyst:

A catalyst can be used upon synthesis of the incompletely condensed product $P_1$. Specifically, for example, an organic acid such as formic acid or acetic acid, an inorganic acid such as hydrochloric acid or sulfuric acid, or an organic metal such as dibutyltin dimethoxide or tetra-n-butyl titanate can be used.

(1-4-2D) Other Reaction Condition:

Reaction conditions upon synthesis of the incompletely condensed product $P_1$ such as reaction temperature and reaction atmosphere are not particularly limited. The reaction temperature only needs to be appropriately set depending on, for example, a raw material to be used or the boiling point of a solvent. In addition, examples of the reaction atmosphere may include an inert gas atmosphere such as nitrogen or argon, and such an atmosphere as air.

(1-4-2E) Removal of Unreacted Matter:

After the synthesis of the incompletely condensed product $P_1$, remaining unreacted matter (e.g., the fluorine-containing alkoxy silane compound α or the like in which all alkoxy groups are unreacted, namely, in the state T0) is preferably removed. A conventionally known method such as dialysis or ultrafiltration can be utilized as a method of removing the unreacted matter. It should be noted that the presence or absence of the unreacted matter in the incompletely condensed product $P_1$ can be confirmed by means of Si-NMR.

(1-4-3) Content $a_1$ of Fluorine-Containing Alkoxy Silane Unit a:

A content $a_1$ (mol %) of the fluorine-containing alkoxy silane unit a in the incompletely condensed product $P_1$, which is not particularly limited, preferably satisfies a relationship represented by the following expression (2). The term "mol %" as used herein refers to a value represented by multiplying a molar fraction by 100.

$$20 \le a_1 \le 100 \qquad \text{Expression (2)}$$

Setting the content $a_1$ to 20 or more can sufficiently localize the fluorine-containing alkoxy silane unit a in the incompletely condensed product $P_2$ to be synthesized later, and hence can improve the water repellency of the water-repellent film to be formed.

It should be noted that the content $a_1$ can be calculated from the following expression (4). It should be noted that x in the following expression (4) can be determined from the integration ratio between reacted matter (T1 to T3) and the unreacted matter (T0) obtained by Si-NMR.

$$a_1(\text{mol \%}) = \{\alpha a - x \times [\alpha a/(\alpha a + \beta a + \gamma a)]\}/(\alpha a + \beta a + \gamma a - x) \times 100 \qquad \text{Expression (4)}$$

In the expression (4):

αa represents the charge amount (number of moles) of the fluorine-containing alkoxy silane compound α upon synthesis of the incompletely condensed product $P_1$;

βa represents the charge amount (number of moles) of the alkoxy silane compound β upon synthesis of the incompletely condensed product $P_1$;

γa represents the charge amount (number of moles) of the silane compound γ upon synthesis of the incompletely condensed product $P_1$; and x represents the amount (number of moles) of the unreacted matter (the fluorine-containing alkoxy silane compound α, the alkoxy silane compound β, and the silane compound γ) removed after the synthesis of the incompletely condensed product $P_1$.

(1-4-4) Molecular Weight:

The molecular weight of the incompletely condensed product $P_1$ is not particularly limited. It should be noted that the molecular weight is preferably adjusted to fall within such a range that the incompletely condensed product can be dissolved or uniformly dispersed in the reaction solvent (e.g., 100,000 or less). The molecular weight of the incompletely condensed product $P_1$ can be measured by gel permeation chromatography (GPC).

(1-5) Incompletely Condensed Product $P_2$:

The incompletely condensed product $P_2$ is an incompletely condensed product obtained by further condensing the incompletely condensed product $P_1$ with the alkoxy silane compound β, and is a main component of the water-repellent and oil-repellent composition of the present invention. The definition of the term "incomplete condensation" is the same as that in the case of the incompletely condensed product $P_1$. That is, the incompletely condensed product $P_2$ is a condensed product in which the fluorine-containing alkoxy silane compound α or the like is condensed in a state in which an unreacted alkoxy group or the like partially remains. The incompletely condensed product $P_2$ may contain a silane unit g derived from the silane compound γ in addition to the fluorine-containing alkoxy silane unit a and the alkoxy silane unit b derived from the alkoxy silane compound β.

(1-5-1) Synthesis Method:

The incompletely condensed product $P_2$ can be synthesized by hydrolyzing a mixture of the incompletely condensed product $P_1$ and the alkoxy silane compound β and subjecting the resultant to polycondensation. At the time of the synthesis, the reaction may be performed by adding the silane compound γ in addition to the alkoxy silane compound β.

The same conditions as those of the incompletely condensed product $P_1$ can be applied as conditions upon synthesis of the incompletely condensed product $P_2$ such as reaction solvent, water, catalyst, reaction temperature, and reaction atmosphere.

(1-5-2) Content $a_2$ of Fluorine-Containing Alkoxy Silane Unit a:

A content $a_2$ (mol %) of the fluorine-containing alkoxy silane unit a in the incompletely condensed product $P_2$ which is not particularly limited, preferably satisfies a relationship represented by the following expression (3).

$$0.5 \leq a_2 \leq 20 \qquad \text{Expression (3)}$$

Setting the content $a_2$ to 0.5 or more can improve the water repellency of the water-repellent film to be formed. In addition, setting the content $a_2$ to 20 or less improves the affinity (solubility) of the incompletely condensed product $P_2$ for a solvent and hence facilitates the handling of the incompletely condensed product $P_2$ when the incompletely condensed product is turned into a coating agent. It should be noted that even when the content $a_2$ is set to more than 20, the affinity (solubility) of the incompletely condensed product $P_2$ for the solvent merely reduces and the water repellency of the water-repellent film to be formed hardly improves.

It should be noted that the content $a_2$ can be calculated from the following expression (5). It should be noted that y in the following expression (5) can be determined from the integration ratio between the reacted matter (T1 to T3) and the unreacted matter (T0) obtained by Si-NMR.

$$a_2(\text{mol \%}) = \{Pb \times (\alpha_1/100)\}/(Pb + \beta b + 1b - y) \times 100 \qquad \text{Expression (5)}$$

In the expression (5):

$\alpha_1$ represents the content (mol %) of the fluorine-containing alkoxy silane compound α in the incompletely condensed product $P_1$;

Pb represents the charge amount (number of moles) of the incompletely condensed product $P_1$ upon synthesis of the incompletely condensed product $P_2$;

βb represents the charge amount (number of moles) of the alkoxy silane compound β upon synthesis of the incompletely condensed product $P_2$;

γb represents the charge amount (number of moles) of the silane compound γ upon synthesis of the incompletely condensed product $P_2$; and y represents the amount (number of moles) of the unreacted matter (the fluorine-containing alkoxy silane compound α, the alkoxy silane compound β, and the silane compound γ) removed after the synthesis of the incompletely condensed product $P_2$.

(1-5-3) Relationship Between Content $a_1$ and Content $a_2$:

The water-repellent and oil-repellent composition of the present invention is such that the content $a_1$ (mol %) of the fluorine-containing alkoxy silane unit a in the incompletely condensed product $P_1$ and the content $a_2$ (mol %) of the fluorine-containing alkoxy silane unit a in the incompletely condensed product $P_2$ satisfy a relationship represented by the following expression (1).

$$a_1/a_2 \geq 2 \qquad \text{Expression (1)}$$

Making the content $a_1$ twice or more as large as the content $a_2$ can result in the formation of a water-repellent film excellent in water repellency when the water-repellent and oil-repellent composition of the present invention is used as a coating agent. Although the reason why the water repellency of the water-repellent film improves is not clear, it is supposed that a portion in which the fluorine-containing alkoxy silane unit a is localized is formed in the incompletely condensed product $P_2$ and many of the Rf groups are oriented toward the surface of the water-repellent film, and hence the water-repellent film shows high water repellency.

(1-5-4) Molecular Weight:

The molecular weight of the incompletely condensed product $P_2$ is not particularly limited. It should be noted that the molecular weight is preferably adjusted to fall within such a range that the incompletely condensed product can be dissolved or uniformly dispersed in the reaction solvent (e.g., 100,000 or less). The molecular weight of the incompletely condensed product $P_2$ can be measured by gel permeation chromatography (GPC).

(1-6) Water-Repellent and Oil-Repellent Composition:

The water-repellent and oil-repellent composition of the present invention contains the incompletely condensed product $P_2$. It should be noted that the water-repellent and oil-repellent composition may contain unreacted matter (the fluorine-containing alkoxy silane compound α, the alkoxy silane compound β, the silane compound γ, etc.) that remains upon synthesis of the incompletely condensed product $P_2$.

The water-repellent and oil-repellent composition can be used as it is as a coating agent for forming a water-repellent film, or can be used as the coating agent after having been diluted with a diluent solvent.

Examples of the diluent solvent include a fluorine-containing aliphatic hydrocarbon-based solvent such as 1,1,1,2,2,3,3,4,4,5,5,6,6-tridecafluorooctane or perfluoroheptane; a fluorine-containing aromatic hydrocarbon-based solvent such as benzotrifluoride or m-xylenehexane fluoride; a fluorine-containing ether-based solvent such as 1,1,2,2-tetrafluoro-1-(2,2,2-trifluoroethoxy)ethane (also referred to as "HFE-347pc-f") or 1-ethoxy-1,1,2,2,3,3,4,4,4-nonafluorobutane (also referred to as "HFE-569sf"); an ether-based solvent such as diethyl ether or tetrahydrofuran; a ketone-based solvent such as acetone or methyl isobutyl ketone; an ester-based solvent such as ethyl acetate or butyl acetate; a hydrocarbon-based solvent such as hexane, heptane, toluene, or xylene; a halogenated hydrocarbon-based solvent such as dichloromethane or chloroform; or an alcohol such as methanol or ethanol. Of those, a fluorine-based solvent such as a fluorine-containing aliphatic hydrocarbon-based solvent, a fluorine-containing aromatic hydrocarbon-based solvent, or a fluorine-containing ether-based solvent, or a mixed solvent of the fluorine-based solvent and any other diluent solvent is preferred because any such solvent easily dissolves the water-repellent and oil-repellent composition of the present invention. It should be noted that the use amount of the diluent solvent only needs to be appropriately set depending on its usage conditions.

(2) Water-Repellent Film:

A water-repellent film of the present invention is a water-repellent film formed by using the water-repellent and oil-repellent composition.

(2-1) Forming Method:

The water-repellent film of the present invention can be formed by, for example, a method involving preparing a coating agent which is obtained by using the water-repellent and oil-repellent composition alone or diluting the composition with a diluent solvent; causing the coating agent to adhere to the surface of a base material to form a film; and drying the film under a room temperature condition or under a heating condition.

(2-1-1) Base Material:

Examples of a material constituting the base material may include materials such as glass, ceramic, and metal.

(2-1-2) Film-Forming Method:

The film-forming method is not particularly limited. The film can be formed by a conventionally known film-forming method such as a dipping method, a spin coating method, a bar coating method, a spray method, or application involving using a brush.

(2-1-3) Drying Condition:

The drying temperature only needs to be appropriately determined depending on, for example, the ignition point and flash point of the diluent solvent in the coating agent, and the heat-resistant temperature of the base material. Specifically, the drying temperature is set to preferably room temperature (25° C.) or more and 300° C. or less, more preferably 40° C. or more and 250° C. or less, particularly preferably 50° C. or more and 150° C. or less. In addition, the drying time only needs to be such a time period that the diluent solvent is sufficiently removed and the surface of the water-repellent film to be formed cures.

(2-2) Contact Angle:

The water-repellent film of the present invention preferably has a contact angle of 90° or more. The term "contact angle" as used herein means an indicator of the degree of water repellency of the water-repellent film. When its contact angle is 90° or more, the water-repellent film can be said to show water repellency equal to or higher than that in the case where a fluorine-containing alkoxy silane compound having an Rf group having 8 or more carbon atoms is used. In addition, the term "contact angle" as used herein means the contact angle of the surface of the water-repellent film measured with an automatic contact angle meter. Specifically, the static contact angle of water is measured at five different sites on the formed water-repellent film, and the average (average contact angle) of the three measured values excluding the maximum and the minimum is regarded as the contact angle. Although the kind of the automatic contact angle meter is not particularly limited, for example, "Model CA-VP" manufactured by Kyowa Interface Science Co., Ltd. can be used.

The present invention is hereinafter described in detail by way of Examples. However, the present invention is not limited to Examples. It should be noted that "part(s)" and "%" in the following description refer to "part(s) by mass" and "mass %", respectively, unless otherwise stated.

(1) Synthesis of Fluorine-Containing Alkoxy Silane Compound α

Table 4 shows a list of the fluorine-containing alkoxy silane compound α and the alkoxy silane compound β. The fluorine-containing alkoxy silane compounds α-1 to α-17 were synthesized through the following procedures (Synthesis Examples 1 to 17). Commercial products were used as the alkoxy silane compounds β-1 to β-3 (Commercial Products 1 to 3).

TABLE 4

Structures of fluorine-containing alkoxy silane compound α and alkoxy silane compound β

| Compound | Synthesis Example/Commercial Product | Rf-, R- | Yq | Ap | Z | —SiX$_3$ |
|---|---|---|---|---|---|---|
| α-1 | Synthesis Example 1 | $C_6F_{13}$— | | | —$(CH_2)_2$— | —Si$(OC_2H_5)_3$ |
| α-2 | Synthesis Example 2 | $C_6F_{13}$— | | | —$(CH_2)_2$— | —Si$(OCH_3)_3$ |
| α-3 | Synthesis Example 3 | $C_4F_9$— | | | —$(CH_2)_2$— | —Si$(OC_2H_5)_3$ |
| α-4 | Synthesis Example 4 | $C_3F_7$— | | | —$(CH_2)_2$— | —Si$(OC_2H_5)_3$ |
| α-5 | Synthesis Example 5 | $C_6F_{13}$— | | —CO—O— | —$(CH_2)_3$— | —Si$(OC_2H_5)_3$ |
| α-6 | Synthesis Example 6 | $C_6F_{13}$— | | —CO—O— | —$(CH_2)_{10}$— | —Si$(OC_2H_5)_3$ |
| α-7 | Synthesis Example 7 | $C_6F_{13}$— | | —CO—O— | —$(CH_2)_{20}$— | —Si$(OC_2H_5)_3$ |
| α-8 | Synthesis Example 8 | $C_6F_{13}$— | | —CONH— | —$(CH_2)_2$— | —Si$(OC_2H_5)_3$ |
| α-9 | Synthesis Example 9 | $C_6F_{13}$— | | —O— | —$(CH_2)_2$— | —Si$(OC_2H_5)_3$ |
| α-10 | Synthesis Example 10 | $C_6F_{13}$— | | —S— | —$(CH_2)_3$— | —Si$(OC_2H_5)_3$ |
| α-11 | Synthesis Example 11 | $C_6F_{13}$— | | —CO—S— | —$(CH_2)_3$— | —Si$(OC_2H_5)_3$ |
| α-12 | Synthesis Example 12 | $C_6F_{13}$— | —$CH_2$— | —O—CO— | —$(CH_2)_2$— | —Si$(OC_2H_5)_3$ |
| α-13 | Synthesis Example 13 | $C_6F_{13}$— | —$CH_2$— | —NHCO— | —$(CH_2)_2$— | —Si$(OC_2H_5)_3$ |
| α-14 | Synthesis Example 14 | $C_6F_{13}$— | —$(CH_2)_2$— | —NHCO—O— | —$(CH_2)_3$— | —Si$(OC_2H_5)_3$ |
| α-15 | Synthesis Example 15 | $C_6F_{13}$— | —$CH_2$— | —O—CONH— | —$(CH_2)_3$— | —Si$(OC_2H_5)_3$ |
| α-16 | Synthesis Example 16 | $C_6F_{13}$— | —$CH_2$— | —NHCONH— | —$(CH_2)_3$— | —Si$(OC_2H_5)_3$ |
| α-17 | Synthesis Example 17 | $C_8F_{17}$— | | | —$(CH_2)_2$— | —Si$(OC_2H_5)_3$ |
| β-1 | Commercial Product 1 | $CH_3$— | | | | —Si$(OC_2H_5)_3$ |
| β-2 | Commercial Product 2 | $CH_3$— | | | | —Si$(OCH_3)_3$ |
| β-3 | Commercial Product 3 | $C_6H_{13}$— | | | | —Si$(OCH_3)_3$ |

Synthesis Example 1

1.00 part of perfluorohexylethylene and 0.47 part of triethoxysilane were loaded into a reaction vessel, and were caused to react with each other at 80° C. for 2 hours while being stirred. Thus, the fluorine-containing alkoxy silane compound α-1 was obtained. The resultant fluorine-containing alkoxy silane compound α-1 was analyzed by $^1$H-NMR (trade name: "ECA400", manufactured by JEOL Ltd.). As a result, a spectrum derived from a structure represented by —(CH$_2$)$_2$—Si—(OCH$_2$CH$_3$)$_3$ was observed at δ=0.60 ppm (2H, t), δ=1.15 to 1.30 ppm (9H, m), δ=1.70 ppm (2H, t), and δ=3.75 to 3.90 ppm (6H, m). In addition, the fluorine-containing alkoxy silane compound α-1 was analyzed by $^{19}$F-NMR (trade name: "ECA400", manufactured by JEOL Ltd.). As a result, the integration ratio of fluorine was 13.

Synthesis Example 2

The fluorine-containing alkoxy silane compound α-2 was obtained in the same manner as in Synthesis Example 1 described above except that 0.47 part of triethoxysilane was changed to 0.35 part of trimethoxysilane. The resultant fluorine-containing alkoxy silane compound α-2 was analyzed in the same manner as in Synthesis Example 1 described above. As a result, a spectrum derived from a structure represented by —(CH$_2$)$_2$—Si—(OCH$_3$)$_3$ was observed. In addition, the integration ratio of fluorine was 13.

Synthesis Example 3

The fluorine-containing alkoxy silane compound α-3 was obtained in the same manner as in Synthesis Example 1 described above except that perfluorohexylethylene was changed to perfluorobutylethylene; and 0.67 part of triethoxysilane was used. The resultant fluorine-containing alkoxy silane compound α-3 was analyzed in the same manner as in Synthesis Example 1 described above. As a result, a spectrum derived from a structure represented by —(CH$_2$)$_2$—Si—(OCH$_2$CH$_3$)$_3$ was observed. In addition, the integration ratio of fluorine was 9.

Synthesis Example 4

The fluorine-containing alkoxy silane compound α-4 was obtained in the same manner as in Synthesis Example 1 described above except that perfluorohexylethylene was changed to perfluoropropylethylene; and 0.84 part of triethoxysilane was used. The resultant fluorine-containing alkoxy silane compound α-4 was analyzed in the same manner as in Synthesis Example 1 described above. As a result, a spectrum derived from a structure represented by —(CH$_2$)$_2$—Si—(OCH$_2$CH$_3$)$_3$ was observed. In addition, the integration ratio of fluorine was 7.

Synthesis Example 5

1.00 part of allyl alcohol and 6.30 parts of tridecafluoroheptanoic acid were loaded into a reaction vessel, and were heated at 100° C. for 5 hours while being stirred. The reaction liquid was separated with an aqueous solution of sodium hydroxide and chloroform. After that, the organic layer was recovered and concentrated. Thus, an intermediate was obtained. 1.00 part of the resultant intermediate and 0.41 part of triethoxysilane were caused to react with each other at 80° C. for 2 hours. Thus, the fluorine-containing alkoxy silane compound α-5 was obtained.

The resultant fluorine-containing alkoxy silane compound α-5 was analyzed in the same manner as in Synthesis Example 1 described above. As a result, a spectrum derived from a structure represented by —(CH$_2$)$_3$—Si—(OCH$_2$CH$_3$)$_3$ was observed. In addition, the integration ratio of fluorine was 13. Further, the fluorine-containing alkoxy silane compound α-5 was analyzed with a FT-IR (trade name: "Prestige 21", manufactured by SHIMADZU CORPORATION). As a result, absorption derived from an ester group was observed at 1,780 cm$^{-1}$, and absorption derived from an ethoxysilyl group was observed at 1,080 cm$^{-1}$ and 1,100 cm$^{-1}$.

Synthesis Example 6

The fluorine-containing alkoxy silane compound α-6 was obtained in the same manner as in Synthesis Example 5 described above except that allyl alcohol was changed to 9-decen-1-ol; and 2.80 parts of tridecafluoroheptanoic acid were used. The resultant fluorine-containing alkoxy silane compound α-6 was analyzed in the same manner as in Synthesis Example 1 described above. As a result, a spectrum derived from a structure represented by —(CH$_2$)$_{10}$—Si—(OCH$_2$CH$_3$)$_3$ was observed. In addition, the integration ratio of fluorine was 13. Further, the fluorine-containing alkoxy silane compound α-6 was analyzed with a FT-IR in the same manner as in Synthesis Example 5 described above. As a result, absorption derived from an ester group and absorption derived from an ethoxysilyl group were observed.

Synthesis Example 7

19-eicosen-1-ol was synthesized by using ethylene oxide and 18-bromo-1-octadecene with reference to the description of Organic Syntheses, Coll. Vol. 1, p. 306 (1941); Vol. 6, p. 54 (1926). Next, 9-decen-1-ol was changed to 19-eicosen-1-ol, and 1.47 parts of tridecafluoroheptanoic acid and 0.31 part of triethoxysilane were used. The fluorine-containing alkoxy silane compound α-7 was obtained in the same manner as in Synthesis Example 6 described above except the foregoing. The resultant fluorine-containing alkoxy silane compound α-7 was analyzed in the same manner as in Synthesis Example 1 described above. As a result, a spectrum derived from a structure represented by —(CH$_2$)$_{20}$—Si—(OCH$_2$CH$_3$)$_3$ was observed. In addition, the integration ratio of fluorine was 13. Further, the fluorine-containing alkoxy silane compound α-7 was analyzed with a FT-IR in the same manner as in Synthesis Example 5 described above. As a result, absorption derived from an ester group and absorption derived from an ethoxysilyl group were observed.

Synthesis Example 8

1.00 part of ethen-1-amine and 9.25 parts of perfluoroheptanoyl chloride were loaded into a reaction vessel, and were heated at 100° C. for 5 hours while being stirred. The reaction liquid was separated with a fluorine-based solvent and water. After that, the fluorine-based solvent layer was collected and concentrated. Thus, an intermediate was obtained. 1.00 part of the resultant intermediate and 0.43 part of triethoxysilane were caused to react with each other at 80° C. for 2 hours while being stirred in the reaction vessel. Thus, the fluorine-containing alkoxy silane compound α-8 was obtained. The resultant fluorine-containing alkoxy silane compound α-8 was analyzed in the same manner as in Synthesis Example 1 described above. As a result, a spectrum derived from a structure represented by —(CH$_2$)$_2$—Si—(OCH$_2$CH$_3$)$_3$ was observed. In addition, the integration ratio of fluorine was 13. Further, the fluorine-containing alkoxy silane compound α-8 was analyzed with a FT-IR in the same manner as in Synthesis Example 5 described above. As a result, absorption derived from an amide group and absorption derived from an ethoxysilyl group were observed.

Synthesis Example 9

Dimethyl sulfoxide, 1.00 part of allyl alcohol, and an excess amount of sodium hydride were loaded into a reaction vessel, and were caused to react with one another at room temperature for 1 hour while being stirred. After the reaction liquid had been filtered, the filtrate and 6.88 parts of 1-bromoperfluorohexane were loaded into the reaction vessel, and were caused to react with each other at room temperature for 48 hours while being stirred. The reaction liquid was separated with a fluorine-based solvent and water. After that, the fluorine-based solvent layer was collected and concentrated. Thus, an intermediate was obtained. 1.00 Part of the resultant intermediate and 0.44 part of triethoxysilane were caused to react with each other at 80° C. for 2 hours while being stirred in the reaction vessel. Thus, the fluorine-containing alkoxy silane compound α-9 was obtained. The resultant fluorine-containing alkoxy silane compound α-9 was analyzed in the same manner as in Synthesis Example 1 described above. As a result, a spectrum derived from a structure represented by —(CH$_2$)$_2$—Si—(OCH$_2$CH$_3$)$_3$ was observed. In addition, the integration ratio of fluorine was 13. Further, the fluorine-containing alkoxy silane compound α-9 was analyzed with a FT-IR in the same manner as in Synthesis Example 5 described above. As a result, absorption derived from an ether group and absorption derived from an ethoxysilyl group were observed.

Synthesis Example 10

An intermediate was obtained in the same manner as in Synthesis Example 9 described above except that: allyl alcohol was changed to allyl mercaptan; and 5.38 parts of 1-bromoperfluorohexane were used. 1.00 part of the resultant intermediate and 0.42 part of triethoxysilane were caused to react with each other at 80° C. for 2 hours. Thus, the fluorine-containing alkoxy silane compound α-10 was obtained. The resultant fluorine-containing alkoxy silane compound α-10 was analyzed in the same manner as in Synthesis Example 1 described above. As a result, a spectrum derived from a structure represented by —(CH$_2$)$_3$—Si—(OCH$_2$CH$_3$)$_3$ was observed. In addition, the integration ratio of fluorine was 13. Further, the fluorine-containing alkoxy silane compound α-10 was analyzed with a FT-IR in the same manner as in Synthesis Example 5 described above. As a result, absorption derived from a thioether group and absorption derived from an ethoxysilyl group were observed.

Synthesis Example 11

1.00 part of allyl mercaptan, 5.38 parts of perfluoroheptanoyl chloride, and pyridine were loaded into a reaction vessel, and were caused to react with one another at room temperature for 3 hours while being stirred. The reaction liquid was separated with a fluorine-based solvent and water. After that, the fluorine-based solvent layer was collected and concentrated. Thus, an intermediate was obtained. 1.00 part of the resultant intermediate and 0.40 part of triethoxysilane were caused to react with each other at 80° C. for 2 hours while being stirred in the reaction vessel. Thus, the fluorine-containing alkoxy silane compound α-11 was obtained. The resultant fluorine-containing alkoxy silane compound α-11 was analyzed in the same manner as in Synthesis Example 1 described above. As a result, a spectrum derived from a structure represented by —(CH$_2$)$_3$—Si—(OCH$_2$CH$_3$)$_3$ was observed. In addition, the integration ratio of fluorine was 13. Further, the fluorine-containing alkoxy silane compound α-11 was analyzed with a FT-IR in the same manner as in Synthesis Example 5 described above. As a result, absorption derived from a thioester group and absorption derived from an ethoxysilyl group were observed.

Synthesis Example 12

An intermediate was obtained in the same manner as in Synthesis Example 5 except that allyl alcohol was changed to acrylic acid; and 6.50 parts of tridecafluoroheptanoic acid was changed to 4.88 parts of tridecafluoro-1-heptanol. 1.00 part of the resultant intermediate and 0.41 part of triethoxysilane were caused to react with each other at 80° C. for 2 hours. Thus, the fluorine-containing alkoxy silane compound α-12 was obtained. The resultant fluorine-containing alkoxy silane compound α-12 was analyzed in the same manner as in Synthesis Example 1 described above. As a result, a spectrum derived from a structure represented by —(CH$_2$)$_2$—Si—(OCH$_2$CH$_3$)$_3$ was observed. In addition, the integration ratio of fluorine was 13. Further, the fluorine-containing alkoxy silane compound α-12 was analyzed with a FT-IR in the same manner as in Synthesis Example 5 described above. As a result, absorption derived from an ester group and absorption derived from an ethoxysilyl group were observed.

Synthesis Example 13

An intermediate was obtained in the same manner as in Synthesis Example 8 except that ethen-1-amine was changed to acryloyl chloride; and 9.25 parts of perfluoroheptanoyl chloride was changed to 3.28 parts of tridecafluoroheptylamine. 1.00 part of the resultant intermediate and 0.41 part of triethoxysilane were caused to react with each other at 80° C. for 2 hours. Thus, the fluorine-containing alkoxy silane compound α-13 was obtained. The resultant fluorine-containing alkoxy silane compound α-13 was analyzed in the same manner as in Synthesis Example 1 described above. As a result, a spectrum derived from a structure represented by —(CH$_2$)$_2$—Si—(OCH$_2$CH$_3$)$_3$ was observed. In addition, the integration ratio of fluorine was 13. Further, the fluorine-containing alkoxy silane compound α-13 was analyzed with a FT-IR in the same manner as in Synthesis Example 5 described above. As a result, absorption derived from an amide group and absorption derived from an ethoxysilyl group were observed.

Synthesis Example 14

An intermediate was obtained in the same manner as in Synthesis Example 8 except that ethen-1-amine was changed to allyl alcohol; and 9.25 parts of perfluoroheptanoyl chloride was changed to 6.70 parts of perfluorohexylethyl isocyanate. 1.00 part of the resultant intermediate and 0.38 part of triethoxysilane were caused to react with each other at 80° C. for 2 hours. Thus, the fluorine-containing alkoxy silane compound α-14 was obtained. The resultant fluorine-containing alkoxy silane compound α-14 was analyzed in the same manner as in Synthesis Example 1 described above. As a result, a spectrum derived from a structure represented by —(CH$_2$)$_3$—Si—(OCH$_2$CH$_3$)$_3$ was observed. In addition, the integration ratio of fluorine was 13. Further, the fluorine-containing alkoxy silane compound α-14 was analyzed with a FT-IR in the same manner as in Synthesis Example 5 described above. As a result, absorption derived from a urethane group and absorption derived from an ethoxysilyl group were observed.

Synthesis Example 15

The fluorine-containing alkoxy silane compound α-15 was obtained in the same manner as in Synthesis Example 14 except that allyl alcohol was changed to allyl isocyanate; and 6.70 parts of perfluorohexylethyl isocyanate was changed to 4.25 parts of tridecafluoro-1-heptanol. The resultant fluorine-containing alkoxy silane compound α-15 was analyzed in the same manner as in Synthesis Example 1 described above. As a result, a spectrum derived from a structure represented by —$(CH_2)_3$—Si—$(OCH_2CH_3)_3$ was observed. In addition, the integration ratio of fluorine was 5. Further, the fluorine-containing alkoxy silane compound α-15 was analyzed with a FT-IR in the same manner as in Synthesis Example 5 described above. As a result, absorption derived from a urethane group and absorption derived from an ethoxysilyl group were observed.

Synthesis Example 16

The fluorine-containing alkoxy silane compound α-16 was obtained in the same manner as in Synthesis Example 15 except that 4.25 parts of tridecafluoro-1-heptanol was changed to 4.20 parts of tridecafluoroheptylamine. The resultant fluorine-containing alkoxy silane compound α-16 was analyzed in the same manner as in Synthesis Example 1 described above. As a result, a spectrum derived from a structure represented by —$(CH_2)_3$—Si—$(OCH_2CH_3)_3$ was observed. In addition, the integration ratio of fluorine was 13. Further, the fluorine-containing alkoxy silane compound α-16 was analyzed with a FT-IR in the same manner as in Synthesis Example 5 described above. As a result, absorption derived from a urea group and absorption derived from an ethoxysilyl group were observed.

Synthesis Example 17

The fluorine-containing alkoxy silane compound α-17 was obtained in the same manner as in Synthesis Example 1 described above except that perfluorohexylethylene was changed to perfluorooctylethylene; and 0.40 part of triethoxysilane was used. The resultant fluorine-containing alkoxy silane compound α-17 was analyzed in the same manner as in Synthesis Example 1 described above. As a result, a spectrum derived from a structure represented by —$(CH_2)_2$—Si—$(OCH_2CH_3)_3$ was observed. In addition, the integration ratio of fluorine was 17.

(2) Preparation of Water-Repellent and Oil-Repellent Composition

Example 1

1.00 part of the fluorine-containing alkoxy silane compound α-1, 0.52 part of the alkoxy silane compound β-1, 0.13 part of water, and 6.10 parts of ethanol were loaded into a reaction vessel, and were heated at 70° C. for 12 hours while being stirred. After the reaction, the fluorine-containing alkoxy silane compound α-1 and the alkoxy silane compound β-1 that had been unreacted were removed by subjecting the reaction liquid to ultrafiltration. Thus, an incompletely condensed product $P_1$ was obtained. The resultant incompletely condensed product $P_1$ was analyzed by Si-NMR (trade name: "ECA400", manufactured by JEOL Ltd.). As a result, a spectrum derived from the T1 was observed at δ=−45 to −55 ppm and a spectrum derived from the T2 was observed at δ=−55 to −65 ppm, and hence it was confirmed that the incompletely condensed product $P_1$ was an incompletely condensed product. The incompletely condensed product $P_2$ was synthesized by loading 1.00 part of the incompletely condensed product $P_1$, 4.01 parts of the alkoxy silane compound β-1, 0.61 part of water, and 20.0 parts of ethanol into a reaction vessel; and heating the contents at 70° C. for 12 hours while stirring the contents. Thus, a water-repellent and oil-repellent composition 1 was obtained. Table 5 shows raw materials used, the content $a_1$ of the fluorine-containing alkoxy silane unit a in the incompletely condensed product $P_1$, the content $a_2$ of the fluorine-containing alkoxy silane unit a in the incompletely condensed product $P_2$ and the value $a_1/a_2$. It should be noted that the term "compound α" in the table means the fluorine-containing alkoxy silane compound α and the term "compound β" therein means the alkoxy silane compound β.

TABLE 5

Raw materials for water-repellent and oil-repellent composition, and contents of fluorine-containing alkoxy silane unit a ($a_1$, $a_2$, $a_1/a_2$)

| | | Incompletely condensed product $P_1$ | | | Water-repellent and oil-repellent composition | | | |
|---|---|---|---|---|---|---|---|---|
| | | Compound α | Compound β | $a_1$ | Composition | Compound β | $a_2$ | $a_1/a_2$ |
| Example | 1 | α-1 | β-1 | 40 | 1 | β-1 | 5 | 8 |
| | 2 | α-1 | β-1 | 40 | 2 | β-1 | 20 | 2 |
| | 3 | α-1 | β-1 | 20 | 3 | β-1 | 10 | 2 |
| | 4 | α-1 | β-1 | 80 | 4 | β-1 | 5 | 16 |
| | 5 | α-1 | β-2 | 40 | 5 | β-2 | 5 | 8 |
| | 6 | α-1 | β-3 | 40 | 6 | β-3 | 5 | 8 |
| | 7 | α-2 | β-1 | 40 | 7 | β-1 | 5 | 8 |
| | 8 | α-3 | β-1 | 40 | 8 | β-1 | 5 | 8 |
| | 9 | α-3 | — | 100 | 9 | β-1 | 10 | 10 |
| | 10 | α-4 | β-1 | 40 | 10 | β-1 | 5 | 8 |
| | 11 | α-5 | β-1 | 40 | 11 | β-1 | 5 | 8 |
| | 12 | α-6 | β-1 | 40 | 12 | β-1 | 5 | 8 |
| | 13 | α-6 | β-1 | 20 | 13 | β-1 | 0.5 | 40 |

TABLE 5-continued

Raw materials for water-repellent and oil-repellent composition, and contents of fluorine-containing alkoxy silane unit a ($a_1$, $a_2$, $a_1/a_2$)

| | | Incompletely condensed product $P_1$ | | | Water-repellent and oil-repellent composition | | | |
|---|---|---|---|---|---|---|---|---|
| | | Compound α | Compound β | $a_1$ | Composition | Compound β | $a_2$ | $a_1/a_2$ |
| | 14 | α-7 | β-1 | 40 | 14 | β-1 | 5 | 8 |
| | 15 | α-8 | β-1 | 40 | 15 | β-1 | 5 | 8 |
| | 16 | α-9 | β-1 | 40 | 16 | β-1 | 5 | 8 |
| | 17 | α-10 | β-1 | 40 | 17 | β-1 | 5 | 8 |
| | 18 | α-11 | β-1 | 40 | 18 | β-1 | 5 | 8 |
| | 19 | α-12 | β-1 | 40 | 19 | β-1 | 5 | 8 |
| | 20 | α-13 | β-1 | 40 | 20 | β-1 | 5 | 8 |
| | 21 | α-14 | β-1 | 40 | 21 | β-1 | 5 | 8 |
| | 22 | α-15 | β-1 | 40 | 22 | β-1 | 5 | 8 |
| | 23 | α-16 | β-1 | 40 | 23 | β-1 | 5 | 8 |
| | 24 | α-3 | β-1 | 80 | 24 | β-1 | 25 | 3.2 |
| | 25 | α-1 | β-1 | 15 | 25 | β-1 | 5 | 3 |
| | 26 | α-6 | β-1 | 30 | 26 | β-1 | 0.4 | 75 |
| Comparative | 1 | α-3 | β-1 | 10 | 27 | β-1 | 7 | 1.4 |
| Example | 2 | α-3 | β-1 | 20 | 28 | β-1 | 15 | 1.3 |
| | 3 | α-2 | β-1 | — | 29 | — | 5 | — |
| | 4 | α-17 | β-1 | — | 30 | — | 5 | — |

Example 2

A water-repellent and oil-repellent composition 2 was obtained in the same manner as in Example 1 described above except that the amounts of the alkoxy silane compound β-1, water, and ethanol to be used upon synthesis of the incompletely condensed product $P_2$ were changed to 0.58 part, 0.09 part, and 6.30 parts, respectively. Table 5 shows the results.

Example 3

The incompletely condensed product $P_1$ was synthesized in the same manner as in Example 1 described above except that the amounts of the alkoxy silane compound β-1, water, and ethanol to be used upon synthesis of the incompletely condensed product $P_1$ were changed to 1.39 parts, 0.27 part, and 9.56 parts, respectively. Further, a water-repellent and oil-repellent composition 3 was obtained in the same manner as in Example 1 described above except that the amounts of the alkoxy silane compound β-1, water, and ethanol to be used upon synthesis of the incompletely condensed product $P_2$ were changed to 0.73 part, 0.11 part, and 6.92 parts, respectively. Table 5 shows the results.

Example 4

The incompletely condensed product $P_1$ was synthesized in the same manner as in Example 1 described above except that the amounts of the alkoxy silane compound β-1, water, and ethanol to be used upon synthesis of the incompletely condensed product $P_1$ were changed to 0.09 part, 0.07 part, and 4.35 parts, respectively. Further, a water-repellent and oil-repellent composition 4 was obtained in the same manner as in Example 1 described above except that the amounts of the alkoxy silane compound β-1, water, and ethanol to be used upon synthesis of the incompletely condensed product $P_2$ were changed to 6.02 parts, 0.91 part, and 28.09 parts, respectively. Table 5 shows the results.

Example 5

The incompletely condensed product $P_1$ was synthesized in the same manner as in Example 1 described above except that the alkoxy silane compound β-1 to be used upon synthesis of the incompletely condensed product $P_1$ was changed to the alkoxy silane compound β-2; and the amounts of the alkoxy silane compound β-2, water, and ethanol were changed to 0.40 part, 0.13 part, and 5.60 parts, respectively. Further, a water-repellent and oil-repellent composition 5 was obtained in the same manner as in Example described above except that the amounts of the alkoxy silane compound β-2, water, and ethanol to be used upon synthesis of the incompletely condensed product $P_2$ were changed to 3.34 parts, 0.66 part, and 17.3 parts, respectively. Table 5 shows the results.

Example 6

The incompletely condensed product $P_1$ was synthesized in the same manner as in Example 1 described above except that the alkoxy silane compound β-1 to be used upon synthesis of the incompletely condensed product $P_1$ was changed to the alkoxy silane compound β-3; and the amounts of the alkoxy silane compound β-3, water, and ethanol were changed to 0.73 part, 0.13 part, and 6.92 parts, respectively. Further, a water-repellent and oil-repellent composition 6 was obtained in the same manner as in Example 1 described above except that: the alkoxy silane compound β-1 to be used upon synthesis of the incompletely condensed product $P_2$ was changed to the alkoxy silane compound β-3; and the amounts of the alkoxy silane compound β-3, water, and ethanol were changed to 4.92 parts, 0.53 part, and 23.7 parts, respectively. Table 5 shows the results.

Example 7

The incompletely condensed product $P_1$ was synthesized in the same manner as in Example 1 described above except that the fluorine-containing alkoxy silane compound α-1 to be used upon synthesis of the incompletely condensed product $P_1$ was changed to the fluorine-containing alkoxy silane compound α-2; and the amounts of the alkoxy silane compound β-1, water, and ethanol were changed to 0.57 part, 0.14 part, and 6.28 parts, respectively. Further, a water-repellent and oil-repellent composition 7 was obtained in the same manner as in Example 1 described above except that the amounts of the alkoxy silane compound β-1, water, and ethanol to be used upon synthesis of the incompletely condensed product $P_2$ were changed to 4.24 parts, 0.64 part, and 21.0 parts, respectively. Table 5 shows the results.

Example 8

The incompletely condensed product $P_1$ was synthesized in the same manner as in Example 1 described above except that the fluorine-containing alkoxy silane compound α-1 to be used upon synthesis of the incompletely condensed product $P_1$ was changed to the fluorine-containing alkoxy silane compound α-3; and the amounts of the alkoxy silane compound β-1, water, and ethanol were changed to 0.65 part, 0.17 part, and 6.60 parts, respectively. Further, a water-repellent and oil-repellent composition 8 was obtained in the same manner as in Example 1 described above except that the amounts of the alkoxy silane compound β-1, water, and ethanol to be used upon synthesis of the incompletely condensed product $P_2$ were changed to 4.60 parts, 0.69 part, and 22.4 parts, respectively. Table 5 shows the results.

Example 9

1.00 part of the alkoxy silane compound α-3, 0.066 part of water, and 4.00 parts of ethanol were loaded into a reaction vessel, and were heated at 70° C. for 12 hours while being stirred. After the reaction, the unreacted fluorine-containing alkoxy silane compound α-3 was removed by subjecting the reaction liquid to ultrafiltration. Thus, the incompletely condensed product $P_1$ was obtained. The resultant incompletely condensed product $P_1$ was analyzed in the same manner as in Example 1 described above. As a result, spectra derived from the T1 and the T2 were observed, and hence it was confirmed that the incompletely condensed product $P_1$ was an incompletely condensed product. The incompletely condensed product $P_2$ was synthesized by loading 1.00 part of the resultant incompletely condensed product $P_1$, 3.91 parts of the alkoxy silane compound β-1, 0.59 part of water, and 19.6 parts of ethanol into a reaction vessel; and heating the contents at 70° C. for 12 hours while stirring the contents. Thus, a water-repellent and oil-repellent composition 9 was obtained. Table 5 shows the results.

Example 10

The incompletely condensed product $P_1$ was synthesized in the same manner as in Example 1 described above except that the fluorine-containing alkoxy silane compound α-1 to be used upon synthesis of the incompletely condensed product $P_1$ was changed to the fluorine-containing alkoxy silane compound α-4; and the amounts of the alkoxy silane compound β-1, water, and ethanol were changed to 0.74 part, 0.19 part, and 6.96 parts, respectively. Further, a water-repellent and oil-repellent composition 10 was obtained in the same manner as in Example 1 described above except that the amounts of the alkoxy silane compound β-1, water, and ethanol to be used upon synthesis of the incompletely condensed product $P_2$ were changed to 4.97 parts, 0.75 part, and 23.8 parts, respectively. Table 5 shows the results.

Example 11

The incompletely condensed product $P_1$ was synthesized in the same manner as in Example 1 described above except that the fluorine-containing alkoxy silane compound α-1 to be used upon synthesis of the incompletely condensed product $P_1$ was changed to the fluorine-containing alkoxy silane compound α-5; and the amounts of the alkoxy silane compound β-1, water, and ethanol were changed to 0.48 part, 0.12 part, and 5.92 parts, respectively. Further, a water-repellent and oil-repellent composition 11 was obtained in the same manner as in Example 1 described above except that the amounts of the alkoxy silane compound β-1, water, and ethanol to be used upon synthesis of the incompletely condensed product $P_2$ were changed to 3.80 parts, 0.58 part, and 19.2 parts, respectively. Table 5 shows the results.

Example 12

The incompletely condensed product $P_1$ was synthesized in the same manner as in Example 1 described above except that the fluorine-containing alkoxy silane compound α-1 to be used upon synthesis of the incompletely condensed product $P_1$ was changed to the fluorine-containing alkoxy silane compound α-6; and the amounts of the alkoxy silane compound β-1, water, and ethanol were changed to 0.43 part, 0.11 part, and 5.72 parts, respectively. Further, a water-repellent and oil-repellent composition 12 was obtained in the same manner as in Example 1 described above except that the amounts of the alkoxy silane compound β-1, water, and ethanol to be used upon synthesis of the incompletely condensed product $P_2$ were changed to 3.51 parts, 0.53 part, and 18.0 parts, respectively. Table 5 shows the results.

Example 13

The incompletely condensed product $P_1$ was synthesized in the same manner as in Example 12 described above except that the amounts of the alkoxy silane compound β-1, water, and ethanol to be used upon synthesis of the incompletely condensed product $P_1$ were changed to 1.14 parts, 0.22 part, and 8.56 parts, respectively. Further, a water-repellent and oil-repellent composition 13 was obtained in the same manner as in Example 12 described above except that the amounts of the alkoxy silane compound β-1, water, and ethanol to be used upon synthesis of the incompletely condensed product $P_2$ were changed to 26.0 parts, 3.95 parts, and 108 parts, respectively. Table 5 shows the results.

Example 14

The incompletely condensed product $P_1$ was synthesized in the same manner as in Example 1 described above except that the fluorine-containing alkoxy silane compound α-1 to be used upon synthesis of the incompletely condensed product $P_1$ was changed to the fluorine-containing alkoxy silane compound α-7; and the amounts of the alkoxy silane compound β-1, water, and ethanol were changed to 0.35 part, 0.09 part, and 5.40 parts, respectively. Further, a water-repellent and oil-repellent composition 14 was obtained in the same manner as in Example 1 described above except that the amounts of the alkoxy silane compound β-1, water, and ethanol to be used upon synthesis of the incompletely condensed product $P_2$ were changed to 3.03 parts, 0.45 part, and 16.2 parts, respectively. Table 5 shows the results.

Example 15

The incompletely condensed product $P_1$ was synthesized in the same manner as in Example 1 described above except that the fluorine-containing alkoxy silane compound α-1 to be used upon synthesis of the incompletely condensed product $P_1$ was changed to the fluorine-containing alkoxy silane compound α-8; and the amounts of the alkoxy silane compound β-1, water, and ethanol were changed to 0.48 part, 0.12 part, and 5.92 parts, respectively. Further, a water-repellent and oil-repellent composition 15 was obtained in the same manner as in Example 1 described above except that the amounts of the alkoxy silane compound β-1, water, and ethanol to be used upon synthesis of the incompletely condensed product $P_2$ were changed to 3.80 parts, 0.58 part, and 19.2 parts, respectively. Table 5 shows the results.

Example 16

The incompletely condensed product $P_1$ was synthesized in the same manner as in Example 1 described above except that the fluorine-containing alkoxy silane compound α-1 to be used upon synthesis of the incompletely condensed product $P_1$ was changed to the fluorine-containing alkoxy silane compound α-9; and the amounts of the alkoxy silane compound β-1, water, and ethanol were changed to 0.51 part, 0.13 part, and 6.05 parts, respectively. Further, a water-repellent and oil-repellent composition 16 was obtained in the same manner as in Example 1 described above except that the amounts of the alkoxy silane compound β-1, water, and ethanol to be used upon synthesis of the incompletely condensed product $P_2$ were changed to 3.92 parts, 0.60 part, and 19.7 parts, respectively. Table 5 shows the results.

Example 17

The incompletely condensed product $P_1$ was synthesized in the same manner as in Example 1 described above except that the fluorine-containing alkoxy silane compound α-1 to be used upon synthesis of the incompletely condensed product $P_1$ was changed to the fluorine-containing alkoxy silane compound α-10; and the amounts of the alkoxy silane compound β-1, water, and ethanol were changed to 0.48 part, 0.12 part, and 5.92 parts, respectively. Further, a water-repellent and oil-repellent composition 17 was obtained in the same manner as in Example 1 described above except that the amounts of the alkoxy silane compound β-1, water, and ethanol to be used upon synthesis of the incompletely condensed product $P_2$ were changed to 3.80 parts, 0.58 part, and 19.2 parts, respectively. Table 5 shows the results.

Example 18

The incompletely condensed product $P_1$ was synthesized in the same manner as in Example 1 described above except that the fluorine-containing alkoxy silane compound α-1 to be used upon synthesis of the incompletely condensed product $P_1$ was changed to the fluorine-containing alkoxy silane compound α-11; and the amounts of the alkoxy silane compound β-1, water, and ethanol were changed to 0.47 part, 0.12 part, and 5.88 parts, respectively. Further, a water-repellent and oil-repellent composition 18 was obtained in the same manner as in Example 1 described above except that the amounts of the alkoxy silane compound β-1, water, and ethanol to be used upon synthesis of the incompletely condensed product $P_2$ were changed to 3.72 parts, 0.56 part, and 18.9 parts, respectively. Table 5 shows the results.

Example 19

The incompletely condensed product $P_1$ was synthesized in the same manner as in Example 1 described above except that the fluorine-containing alkoxy silane compound α-1 to be used upon synthesis of the incompletely condensed product $P_1$ was changed to the fluorine-containing alkoxy silane compound α-12; and the amounts of the alkoxy silane compound β-1, water, and ethanol were changed to 0.47 part, 0.12 part, and 5.88 parts, respectively. Further, a water-repellent and oil-repellent composition 19 was obtained in the same manner as in Example 1 described above except that the amounts of the alkoxy silane compound β-1, water, and ethanol to be used upon synthesis of the incompletely condensed product $P_2$ were changed to 3.73 parts, 0.57 part, and 18.9 parts, respectively. Table 5 shows the results.

Example 20

The incompletely condensed product $P_1$ was synthesized in the same manner as in Example 1 described above except that the fluorine-containing alkoxy silane compound α-1 to be used upon synthesis of the incompletely condensed product $P_1$ was changed to the fluorine-containing alkoxy silane compound α-13; and the amounts of the alkoxy silane compound β-1, water, and ethanol were changed to 0.47 part, 0.12 part, and 5.88 parts, respectively. Further, a water-repellent and oil-repellent composition 20 was obtained in the same manner as in Example 1 described above except that the amounts of the alkoxy silane compound β-1, water, and ethanol to be used upon synthesis of the incompletely condensed product $P_2$ were changed to 3.74 parts, 0.57 part, and 18.9 parts, respectively. Table 5 shows the results.

Example 21

The incompletely condensed product $P_1$ was synthesized in the same manner as in Example 1 described above except that the fluorine-containing alkoxy silane compound α-1 to be used upon synthesis of the incompletely condensed product $P_1$ was changed to the fluorine-containing alkoxy silane compound α-14; and the amounts of the alkoxy silane compound β-1, water, and ethanol were changed to 0.44 part, 0.11 part, and 5.76 parts, respectively. Further, a water-repellent and oil-repellent composition 21 was obtained in the same manner as in Example 1 described above except that the amounts of the alkoxy silane compound β-1, water, and ethanol to be used upon synthesis of the incompletely condensed product $P_2$ were changed to 3.55 parts, 0.54 part, and 18.9 parts, respectively. Table 5 shows the results.

Example 22

The incompletely condensed product $P_1$ was synthesized in the same manner as in Example 1 described above except that the fluorine-containing alkoxy silane compound α-1 to be used upon synthesis of the incompletely condensed product $P_1$ was changed to the fluorine-containing alkoxy silane compound α-15; and the amounts of the alkoxy silane compound β-1, water, and ethanol were changed to 0.45 part, 0.11 part, and 5.80 parts, respectively. Further, a water-repellent and oil-repellent composition 22 was obtained in the same manner as in Example 1 described above except that the amounts of the alkoxy silane compound β-1, water, and ethanol to be used upon synthesis of the incompletely condensed product $P_2$ were changed to 3.61 parts, 0.55 part, and 18.4 parts, respectively. Table 5 shows the results.

Example 23

The incompletely condensed product $P_1$ was synthesized in the same manner as in Example 1 described above except that the fluorine-containing alkoxy silane compound α-1 to be used upon synthesis of the incompletely condensed product P₁ was changed to the fluorine-containing alkoxy silane compound α-16; and the amounts of the alkoxy silane compound β-1, water, and ethanol were changed to 0.45 part, 0.12 part, and 5.80 parts, respectively. Further, a water-repellent and oil-repellent composition 23 was obtained in the same manner as in Example 1 described above except that the amounts of the alkoxy silane compound β-1, water, and ethanol to be used upon synthesis of the incompletely condensed product P₂ were changed to 3.61 parts, 0.55 part, and 18.4 parts, respectively. Table 5 shows the results.

Example 24

The incompletely condensed product P₁ was synthesized in the same manner as in Example 1 described above except that the fluorine-containing alkoxy silane compound α-1 to be used upon synthesis of the incompletely condensed product P₁ was changed to the fluorine-containing alkoxy silane compound α-3; and the amounts of the alkoxy silane compound β-1, water, and ethanol were changed to 0.19 part, 0.09 part, and 4.76 parts, respectively. Further, a water-repellent and oil-repellent composition 24 was obtained in the same manner as in Example 1 described above except that the amounts of the alkoxy silane compound β-1, water, and ethanol to be used upon synthesis of the incompletely condensed product P₂ were changed to 1.08 parts, 0.16 part, and 8.31 parts, respectively. Table 5 shows the results.

Example 25

The incompletely condensed product P₁ was synthesized in the same manner as in Example 1 described above except that the amounts of the alkoxy silane compound β-1, water, and ethanol to be used upon synthesis of the incompletely condensed product P₁ were changed to 1.98 parts, 0.35 part, and 11.9 parts, respectively. Further, a water-repellent and oil-repellent composition 25 was obtained in the same manner as in Example 1 described above except that the amounts of the alkoxy silane compound β-1, water, and ethanol to be used upon synthesis of the incompletely condensed product P₂ were changed to 1.56 parts, 0.23 part, and 10.3 parts, respectively. Table 5 shows the results.

Example 26

The incompletely condensed product P₁ was synthesized in the same manner as in Example 1 described above except that the fluorine-containing alkoxy silane compound α-1 to be used upon synthesis of the incompletely condensed product P₁ was changed to the fluorine-containing alkoxy silane compound α-6; and the amounts of the alkoxy silane compound β-1, water, and ethanol were changed to 0.67 part, 0.15 part, and 6.68 parts, respectively. Further, a water-repellent and oil-repellent composition 26 was obtained in the same manner as in Example 1 described above except that the amounts of the alkoxy silane compound β-1, water, and ethanol to be used upon synthesis of the incompletely condensed product P₂ were changed to 42.3 parts, 6.41 parts, and 175 parts, respectively. Table 5 shows the results.

Comparative Example 1

The incompletely condensed product P₁ was synthesized in the same manner as in Example 1 described above except that the fluorine-containing alkoxy silane compound α-1 to be used upon synthesis of the incompletely condensed product P₁ was changed to the fluorine-containing alkoxy silane compound α-3; and the amounts of the alkoxy silane compound β-1, water, and ethanol were changed to 3.91 parts, 0.66 part, and 19.8 parts, respectively. Further, a water-repellent and oil-repellent composition 27 was obtained in the same manner as in Example 1 described above except that the amounts of the alkoxy silane compound β-1, water, and ethanol to be used upon synthesis of the incompletely condensed product P₂ were changed to 0.37 part, 0.06 part, and 5.50 parts, respectively. Table 5 shows the results.

Comparative Example 2

The incompletely condensed product P₁ was synthesized in the same manner as in Comparative Example 1 described above except that the amounts of the alkoxy silane compound β-1, water, and ethanol to be used upon synthesis of the incompletely condensed product P₁ were changed to 1.74 parts, 0.33 part, and 11.0 parts, respectively. Further, a water-repellent and oil-repellent composition 28 was obtained in the same manner as in Comparative Example 1 described above except that the amounts of the alkoxy silane compound β-1, water, and ethanol to be used upon synthesis of the incompletely condensed product P₂ were changed to 0.26 part, 0.04 part, and 5.06 parts, respectively. Table 5 shows the results.

Comparative Example 3

The incompletely condensed product P₂ was synthesized by loading 1.00 part of the fluorine-containing alkoxy silane compound α-2, 6.63 parts of the alkoxy silane compound β-1, 1.06 parts of water, and 30.5 parts of ethanol into a reaction vessel; and heating the contents at 70° C. for 20 hours while stirring the contents. Thus, a water-repellent and oil-repellent composition 29 was obtained. Table 5 shows the results.

Comparative Example 4

The incompletely condensed product P₂ was synthesized by loading 1.00 part of the fluorine-containing alkoxy silane compound α-17, 6.43 parts of the alkoxy silane compound β-1, 1.00 part of water, and 29.7 parts of ethanol into a reaction vessel; and heating the contents at 70° C. for 20 hours while stirring the contents. Thus, a water-repellent and oil-repellent composition 30 was obtained. Table 5 shows the results.

(3) Formation of Water-Repellent Film

Example 27

A coating liquid was prepared by diluting the water-repellent and oil-repellent composition 1 with ethanol so that its solid content concentration became 5%. The coating liquid was applied onto the surface of a slide glass with a spin coater, and was dried at 80° C. for 2 hours. Thus, a water-repellent film 1 was formed.

Examples 28 to 52 and Comparative Examples 5 to 8

Water-repellent films 2 to 30 were formed in the same manner as in Example 27 described above except that the water-repellent and oil-repellent composition 1 was changed to the water-repellent and oil-repellent compositions 2 to 30.

(4) Evaluation for Water Repellency

The contact angles of the surfaces of the formed water-repellent films were measured with an automatic contact angle meter (Model CA-VP manufactured by Kyowa Interface Science Co., Ltd.). Specifically, the static contact angle of water was measured at five different sites on the formed water-repellent film, the average (average contact angle) of the three measured values excluding the maximum and the minimum was calculated, and the water-repellent film was evaluated for its water repellency according to the following evaluation criteria. Table 6 shows the results.

Evaluation Criteria
A: The average contact angle is 100° or more.
B: The average contact angle is 90° or more and less than 100°.
C: The average contact angle is less than 90°.

TABLE 6

Evaluation results of water repellency

|  |  | Water-repellent film | Water-repellent and oil-repellent composition | Water repellency |
|---|---|---|---|---|
| Example | 27 | 1 | 1 | A |
|  | 28 | 2 | 2 | A |
|  | 29 | 3 | 3 | A |
|  | 30 | 4 | 4 | A |
|  | 31 | 5 | 5 | A |
|  | 32 | 6 | 6 | A |
|  | 33 | 7 | 7 | A |
|  | 34 | 8 | 8 | A |
|  | 35 | 9 | 9 | A |
|  | 36 | 10 | 10 | A |
|  | 37 | 11 | 11 | A |
|  | 38 | 12 | 12 | A |
|  | 39 | 13 | 13 | A |
|  | 40 | 14 | 14 | A |
|  | 41 | 15 | 15 | A |
|  | 42 | 16 | 16 | A |
|  | 43 | 17 | 17 | A |
|  | 44 | 18 | 18 | A |
|  | 45 | 19 | 19 | A |
|  | 46 | 20 | 20 | A |
|  | 47 | 21 | 21 | A |
|  | 48 | 22 | 22 | A |
|  | 49 | 23 | 23 | A |
|  | 50 | 24 | 24 | B |
|  | 51 | 25 | 25 | B |
|  | 52 | 26 | 26 | B |
| Comparative Example | 5 | 27 | 27 | C |
|  | 6 | 28 | 28 | C |
|  | 7 | 29 | 29 | C |
|  | 8 | 30 | 30 | A |

As is apparent from the results shown in Table 6, water-repellent films formed by using the water-repellent and oil-repellent compositions of the present invention showed sufficient water repellency (Examples 27 to 52). Of those, a water-repellent film formed by using a water-repellent and oil-repellent composition in which the contents $a_1$ and $a_2$ satisfied the relationships represented by the expression (2) and the expression (3) showed particularly excellent water repellency (Examples 27 to 49).

On the other hand, a water-repellent film formed by using a water-repellent and oil-repellent composition in which the contents $a_1$ and $a_2$ did not satisfy the relationship represented by the expression (1) showed insufficient water repellency (Comparative Examples 5 and 6).

A water-repellent film formed by using a water-repellent and oil-repellent composition containing an incompletely condensed product that was not synthesized by a two-stage reaction (the alkoxy silane compound β was not caused to react with the incompletely condensed product $P_1$) also showed insufficient water repellency (Comparative Example 7). Further, a water-repellent film formed by using a water-repellent and oil-repellent composition containing an incompletely condensed product synthesized by using a fluorine-containing alkoxy silane compound having an Rf group having 8 or more carbon atoms was highly likely to produce PFOA, and had high risk to a living organism and an environment, though the film showed excellent water repellency (Comparative Example 8).

The water-repellent and oil-repellent composition of the present invention can be utilized as a coating agent for forming a water-repellent film. The water-repellent film of the present invention can be utilized as a water-repellent film for (performing the surface modification of) a substance required to have water resistance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-086264, filed Apr. 18, 2014, which is hereby incorporated by reference herein in its entirety.

What is claimed is:

1. A method of producing a water-repellent and oil-repellent composition,
the method comprising:
producing an incompletely condensed product $P_1$ containing a fluorine-containing alkoxy silane unit derived from a fluorine-containing alkoxy silane compound represented by formula (1) in an alcohol-based solvent; and
producing a condensed product $P_2$ by further condensing the incompletely condensed product $P_1$ with an alkoxy silane compound represented by formula (2) in the alcohol-based solvent:

$$R_f\text{—}Y_q\text{-}A_p\text{-}Z\text{—}SiX_3 \qquad (1),$$

wherein, in the formula (1):
$R_f$ represents a perfluoroalkyl group having 1 to 6 carbon atoms;
Y represents an alkanediyl group represented by —(CH$_2$)$_m$—, m represents an integer of 1 to 4, and q represents 0 or 1;
A represents a linking group represented by —CO—O—, —O—CO—, —O—, —S—, —CO—S—, —CONH—, —NHCO—, —NHCO—O—, —O—CONH—, or —NHCONH—, and p represents 0 or 1, provided that when p represents 0, q represents 0;
Z represents an alkanediyl group represented by —(CH$_2$)$_n$—, and n represents an integer of 1 to 20; and
each X independently represents an alkoxy group represented by —OC$_r$H$_{2r+1}$, and r represents an integer of 1 to 4;

$$R\text{—}SiX_3 \qquad (2),$$

wherein, in the formula (2):
R represents an alkyl group having 1 to 6 carbon atoms; and
each X independently represents an alkoxy group represented by —OC$_r$H$_{2r+1}$, and r represents an integer of 1 to 4.

2. The method according to claim 1, wherein a content $a_1$ (mol %) of the fluorine-containing alkoxy silane unit in the incompletely condensed product $P_1$ and a content $a_2$ (mol %) of the fluorine-containing alkoxy silane unit in the incompletely condensed product $P_2$ satisfy relationships represented by expressions (1) to (3):

$$a_1/a_2 \geq 2 \quad (1)$$

$$20 \leq a_1 \leq 100 \quad (2)$$

$$0.5 \leq a_2 \leq 20 \quad (3).$$

3. The method according to claim 1, wherein the incompletely condensed product $P_1$ comprises an incompletely condensed product containing the fluorine-containing alkoxy silane unit and an alkoxy silane unit derived from the alkoxy silane compound.

4. A water-repellent and oil-repellent composition comprising:
an incompletely condensed product containing a fluorine-containing alkoxy silane unit derived from a fluorine-containing alkoxy silane compound represented by formula (1); and
an alcohol-based solvent,
wherein the incompletely condensed product is produced by a method comprising:
producing an incompletely condensed product $P_1$ containing the fluorine-containing alkoxy silane unit derived from the fluorine-containing alkoxy silane compound represented by the formula (1) in the alcohol-based solvent; and
producing a condensed product $P_2$ by further condensing the incompletely condensed product $P_1$ with an alkoxy silane compound represented by formula (2) in the alcohol-based solvent:

$$R_f\text{-}Y_q\text{-}A_p\text{-}Z\text{—}SiX_3 \quad (1),$$

wherein, in the formula (1):
$R_f$ represents a perfluoroalkyl group having 1 to 6 carbon atoms;
Y represents an alkanediyl group represented by —$(CH_2)_m$—, m represents an integer of 1 to 4, and q represents 0 or 1;
A represents a linking group represented by —CO—O—, —O—CO—, —O—, —S—, —CO—S—, —CONH—, —NHCO—, —NHCO—O—, —O—CONH—, or —NHCONH—, and p represents 0 or 1, provided that when p represents 0, q represents 0;
Z represents an alkanediyl group represented by —$(CH_2)_n$—, and n represents an integer of 1 to 20; and
each X independently represents an alkoxy group represented by —$OC_rH_{2r+1}$, and r represents an integer of 1 to 4;

$$R\text{—}SiX_3 \quad (2),$$

wherein, in the formula (2):
R represents an alkyl group having 1 to 6 carbon atoms; and
each X independently represents an alkoxy group represented by —$OC_rH_{2r+1}$, and r represents an integer of 1 to 4.

5. The water-repellent and oil-repellent composition according to claim 4, wherein a content $a_1$ (mol %) of the fluorine-containing alkoxy silane unit in the incompletely condensed product $P_1$ and a content $a_2$ (mol %) of the fluorine-containing alkoxy silane unit in the incompletely condensed product $P_2$ satisfy relationships represented by expressions (1) to (3):

$$a_1/a_2 \geq 2 \quad (1)$$

$$20 \leq a_1 \leq 100 \quad (2)$$

$$0.5 \leq a_2 \leq 20 \quad (3).$$

6. The water-repellent and oil-repellent composition according to claim 4, wherein the incompletely condensed product $P_1$ comprises an incompletely condensed product containing the fluorine-containing alkoxy silane unit and an alkoxy silane unit derived from the alkoxy silane compound.

7. A water-repellent and oil-repellent composition comprising an incompletely condensed product $P_2$ obtained by further condensing an incompletely condensed product $P_1$ containing a fluorine-containing alkoxy silane unit, wherein the fluorine-containing alkoxy silane unit is derived solely from a fluorine-containing alkoxy silane compound represented by formula (1), with an alkoxy silane compound represented by formula (2):

$$R_f\text{-}Y_q\text{-}A_p\text{-}Z\text{—}SiX_3 \quad (1),$$

wherein, in the formula (1):
$R_f$ represents a perfluoroalkyl group having 1 to 6 carbon atoms;
Y represents an alkanediyl group represented by —$(CH_2)_m$—, m represents an integer of 1 to 4, and q represents 0 or 1;
A represents a linking group represented by —CO—O—, —O—CO—, —O—, —S—, —CO—S—, —CONH—, —NHCO—, —NHCO—O—, —O—CONH—, or —NHCONH—, and p represents 0 or 1, provided that when p represents 0, q represents 0;
Z represents an alkanediyl group represented by —$(CH_2)_n$—, and n represents an integer of 1 to 20; and
each X independently represents an alkoxy group represented by —$OC_rH_{2r+1}$, and r represents an integer of 1 to 4;

$$R\text{—}SiX_3 \quad (2),$$

wherein, in the formula (2):
R represents an alkyl group having 1 to 6 carbon atoms; and
each X independently represents an alkoxy group represented by —$OC_rH_{2r+1}$, and r represents an integer of 1 to 4.

8. A water-repellent film formed from the water-repellent and oil-repellent composition according to claim 7.

9. The water-repellent film according to claim 8, which has a contact angle of at least 90°.

10. The water-repellent and oil-repellent composition according to claim 7, wherein a content $a_1$ (mol %) of the fluorine-containing alkoxy silane unit in the incompletely condensed product $P_1$ and a content $a_2$ (mol %) of the fluorine-containing alkoxy silane unit in the incompletely condensed product $P_2$ satisfy relationships represented by expressions (1) to (3):

$$a_1/a_2 \geq 2 \quad (1)$$

$$20 \leq a_1 \leq 100 \quad (2)$$

$$0.5 \leq a_2 \leq 20 \quad (3).$$

11. A water-repellent film formed from the water-repellent and oil-repellent composition according to claim 10.

12. The water-repellent film according to claim 11, which has a contact angle of at least 90°.

* * * * *